(12) United States Patent
Aoyama et al.

(10) Patent No.: US 10,311,804 B2
(45) Date of Patent: Jun. 4, 2019

(54) LIQUID CRYSTAL DISPLAY DEVICE

(71) Applicant: SHARP KABUSHIKI KAISHA, Sakai, Osaka (JP)

(72) Inventors: Iori Aoyama, Sakai (JP); Takahiro Sasaki, Sakai (JP); Yuichi Kita, Sakai (JP); Kazutaka Hanaoka, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 9 days.

(21) Appl. No.: 15/574,120

(22) PCT Filed: May 19, 2016

(86) PCT No.: PCT/JP2016/064863
§ 371 (c)(1),
(2) Date: Nov. 14, 2017

(87) PCT Pub. No.: WO2016/190211
PCT Pub. Date: Dec. 1, 2016

(65) Prior Publication Data
US 2018/0350311 A1 Dec. 6, 2018

(30) Foreign Application Priority Data
May 22, 2015 (JP) ................. 2015-104436

(51) Int. Cl.
G09G 3/34 (2006.01)
G09G 3/36 (2006.01)
(Continued)

(52) U.S. Cl.
CPC .......... *G09G 3/3413* (2013.01); *G02F 1/133* (2013.01); *G02F 1/137* (2013.01); *G02F 1/1343* (2013.01);
(Continued)

(58) Field of Classification Search
CPC ..... G02B 6/0068; G02F 1/133; G02F 1/1343; G02F 1/134363; G02F 1/136286;
(Continued)

(56) References Cited

U.S. PATENT DOCUMENTS 9,252,282 B2 * 2/2016 Iyama ............... G02F 1/134363
9,348,178 B2 * 5/2016 Aoyama ........... G02F 1/133707
(Continued)

FOREIGN PATENT DOCUMENTS

JP 2002-365657 A 12/2002
JP 2006-523850 A 10/2006
(Continued)

Primary Examiner — Mihir K Rayan
(74) Attorney, Agent, or Firm — ScienBiziP, P.C.

(57) ABSTRACT

In particular case second vertical scanning period includes a write period in which a first potential difference V1 is to be given to an upper electrode and a lower electrode. In another particular case, the second vertical scanning period includes a write period in which a second potential difference V2 being greater than the first potential difference V1 is given to the upper electrode and the lower electrode. In the former write period, substantially the same potential as that of a counter electrode is given to the upper electrode, and a different potential from that of the counter electrode is given to the lower electrode. In the latter write period, substantially the same potential as that of the counter electrode is given to the lower electrode, and a different potential from that of the counter electrode is given to the upper electrode.

18 Claims, 17 Drawing Sheets

(51) Int. Cl.
*G02F 1/133* (2006.01)
*G02F 1/137* (2006.01)
*G02F 1/1343* (2006.01)
*G02F 1/1362* (2006.01)
*G02F 1/1368* (2006.01)
*F21V 8/00* (2006.01)

(52) U.S. Cl.
CPC ...... *G02F 1/1368* (2013.01); *G02F 1/134363* (2013.01); *G02F 1/136286* (2013.01); *G09G 3/36* (2013.01); *G09G 3/3607* (2013.01); *G09G 3/3611* (2013.01); *G02B 6/0068* (2013.01); *G02F 2001/13706* (2013.01); *G02F 2001/134381* (2013.01); *G02F 2201/122* (2013.01); *G02F 2201/123* (2013.01); *G09G 2310/0235* (2013.01); *G09G 2320/0252* (2013.01)

(58) Field of Classification Search
CPC ............... G02F 1/1368; G02F 1/137; G02F 2001/134381; G02F 2001/13706; G02F 2201/122; G02F 2201/123; G09G 3/3413; G09G 3/36; G09G 3/3607; G09G 3/3611; G09G 2310/0235; G09G 2320/0252
See application file for complete search history.

(56) References Cited

U.S. PATENT DOCUMENTS

| | | | |
|---|---|---|---|
| 9,372,371 B2* | 6/2016 | Yoshioka | G02F 1/134309 |
| 2005/0024548 A1* | 2/2005 | Choi | G02F 1/134363 |
| | | | 349/43 |
| 2014/0111561 A1 | 4/2014 | Iyama et al. | |
| 2016/0178979 A1* | 6/2016 | Kita | G02F 1/134309 |
| | | | 349/33 |
| 2018/0350311 A1* | 12/2018 | Aoyama | G02F 1/133 |

FOREIGN PATENT DOCUMENTS

| | | |
|---|---|---|
| WO | 2013/001979 A1 | 1/2013 |
| WO | 2014/136586 A1 | 9/2014 |

\* cited by examiner

FIG.7
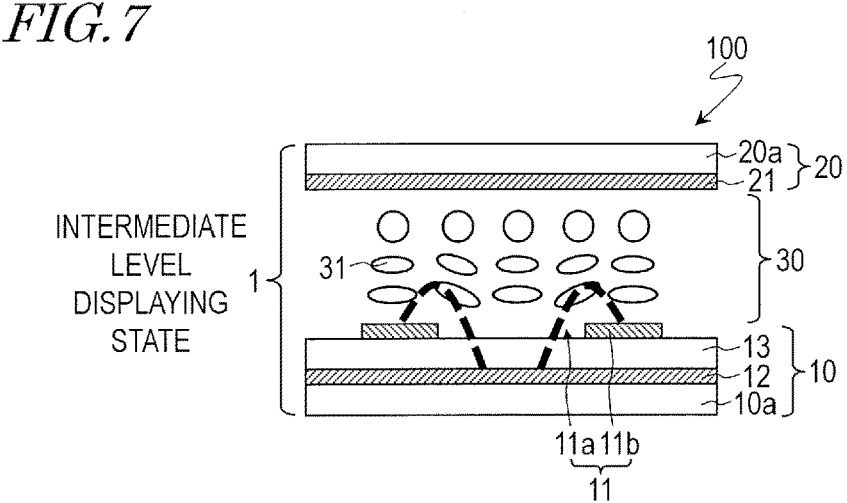
FIG.8
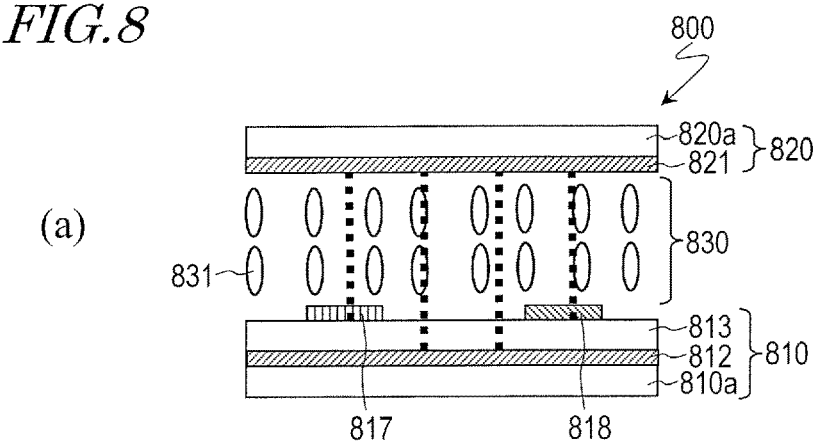
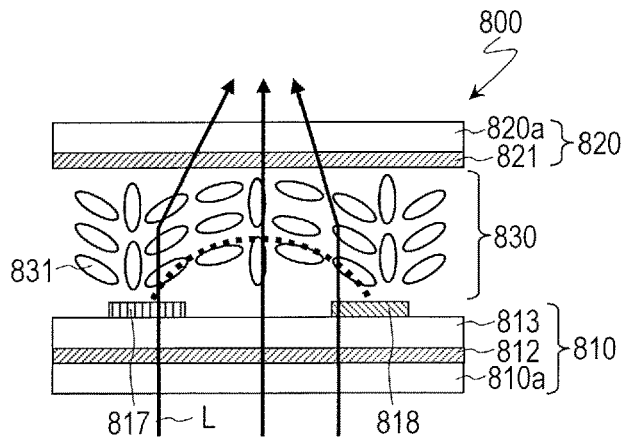

*FIG. 13*
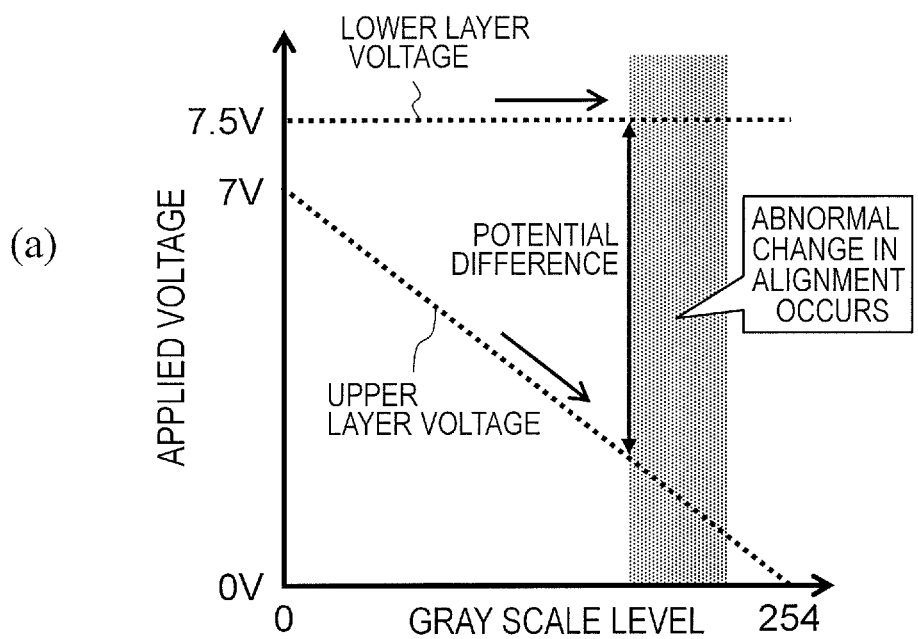
(a)
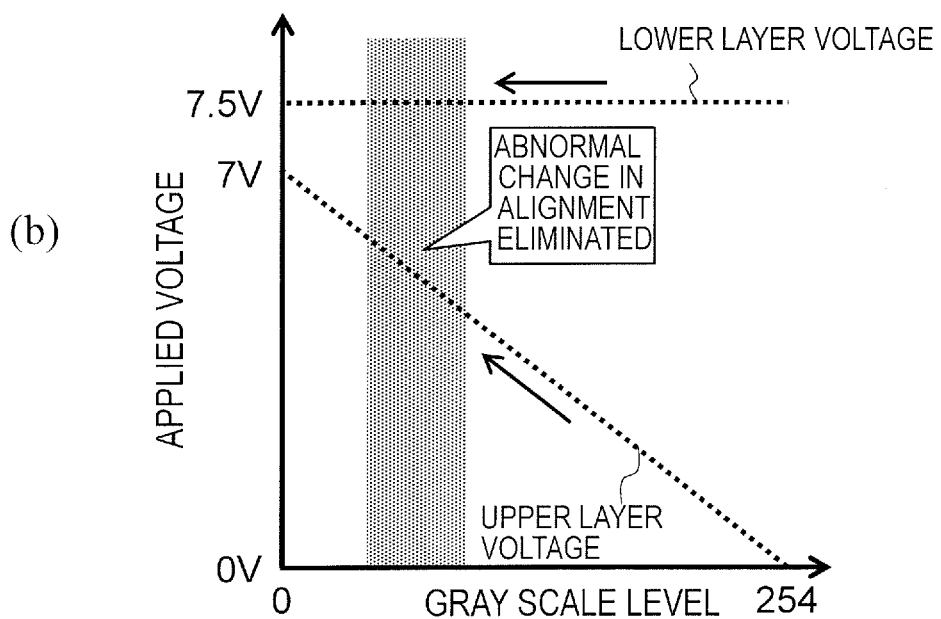
(b)

*FIG.34*
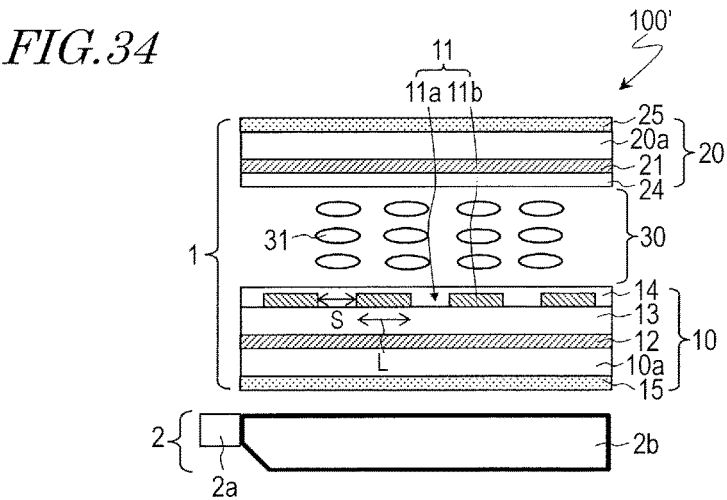
*FIG.35*
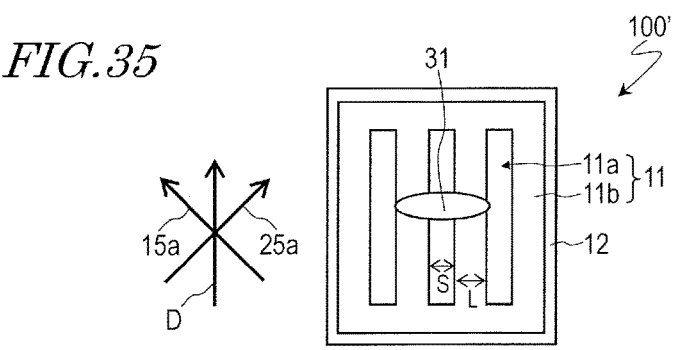
*FIG.36* (a) (b)
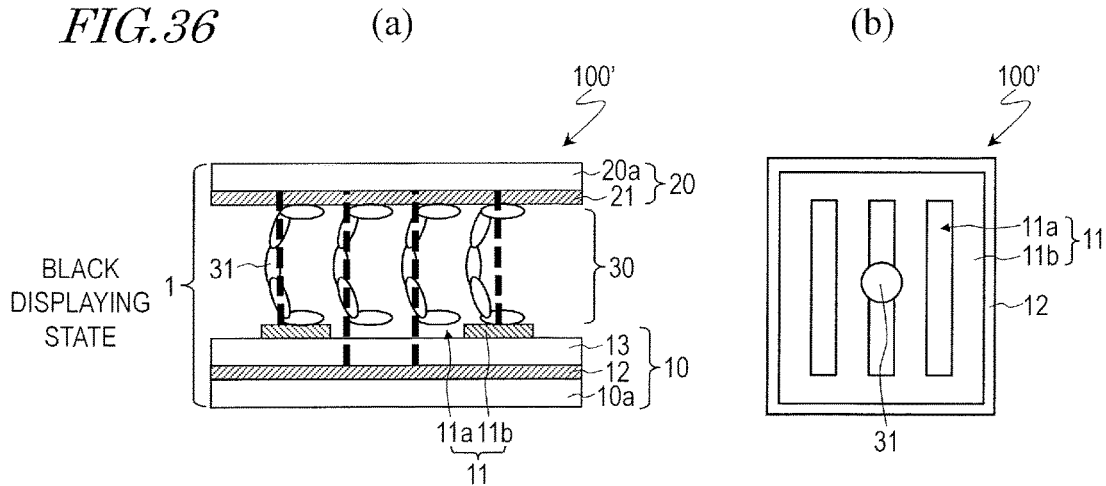
BLACK DISPLAYING STATE

LIQUID CRYSTAL DISPLAY DEVICE

TECHNICAL FIELD

The present invention relates to a liquid crystal display device, and more particularly to a liquid crystal display device which is suitable for use as a see-through display.

BACKGROUND ART

In recent years, see-through displays have been attracting attention as the display devices for information display systems or digital signage. In a see-through display, the background (i.e., the rear-face side of the display panel) is visible in a see-through manner, thereby conducting displaying such that information which is displayed by the display panel is overlaid on the background. Thus, a see-through display has good appeal and eyecatchingness. Application of see-through displays to showcases and show windows has also been proposed.

In the case where a liquid crystal display device is used for a see-through display, its low efficiency of light utilization will be a detriment. The reasons for the low efficiency of light utilization of a liquid crystal display device are the color filters and polarizing plates, which are provided in generic liquid crystal display devices. The color filters and polarizing plates absorb light in specific wavelength regions or light of specific polarization directions.

This has led to the idea of using a liquid crystal display device of the field sequential method. Under the field sequential method, multicolor displaying is performed through time-division switching between colors of light with which a liquid crystal display panel is irradiated from an illumination element. This eliminates the need for color filters, thus improving the efficiency of light utilization. However, under the field sequential method, the liquid crystal display device is required to have a rapid response.

Patent Documents 1 and 2 disclose liquid crystal display devices having improved response characteristics because of an electrode structure being provided which is capable of switchably generating a vertical field or a lateral field across the liquid crystal layer. In the liquid crystal display devices disclosed in Patent Documents 1 and 2, a vertical field is generated across the liquid crystal layer in either one of the transition (rise) from a black displaying state to a white displaying state and the transition (fall) from a white displaying state to a black displaying state, while a lateral field (fringing field) is generated across the liquid crystal layer in the other. Therefore, the torque due to voltage application acts on the liquid crystal molecules in both of a rise and a fall, whereby good response characteristics are attained.

Patent Document 3 also proposes a liquid crystal display device which realizes rapid response by allowing aid alignment regulating force by an electric field to act on the liquid crystal molecules at both of a rise and a fall.

However, it has been found through a study by the Applicant that, when the liquid crystal display devices disclosed in Patent Documents 1, 2 and 3 are used for see-through display, the problem of background blur (it being perceived as double images) may occur, thus resulting in a deteriorated display quality.

Accordingly, the Applicant has proposed in Patent Document 4 a crystal display device which can prevent such problems. Each pixel of the liquid crystal display device disclosed in Patent Document 4 is able to switchably present a black displaying state of performing black displaying with a vertical field generated across the liquid crystal layer and a white displaying state of performing white displaying with a lateral field generated across the liquid crystal layer. Also, each pixel is able to present a transparent displaying state in which a rear face side of the liquid crystal display panel is visible in a see-through manner with no voltage being applied to the liquid crystal layer, thus preventing the problem of background blur (it being perceived as double images).

CITATION LIST

Patent Literature

[Patent Document 1] Japanese National Phase PCT Laid-Open Publication No. 2006-523850
[Patent Document 2] Japanese Laid-Open Patent Publication No. 2002-365657
[Patent Document 3] International Publication No. 2013/001979
[Patent Document 4] International Publication No. 2014/136586

SUMMARY OF INVENTION

Technical Problem

Through a further study by the inventors, it has been found that, in the liquid crystal display device of Patent Document 4, there is a trade-off between stability of alignment and response characteristics are, as will be described in detail later.

The present invention has been made in view of the above problems, and an objective thereof is to provide a liquid crystal display device which excels in both stability of alignment and response characteristics and is suitably used as a see-through display.

Solution to Problem

A liquid crystal display device according to an embodiment of the present invention is a liquid crystal display device comprising a liquid crystal display panel and having a pixel, the liquid crystal display panel including a first substrate and a second substrate opposed to each other and a liquid crystal layer interposed between the first substrate and the second substrate, wherein, the first substrate includes an upper electrode provided for the pixel, and a lower electrode disposed under the upper electrode via an insulating layer, the lower electrode generating a lateral field across the liquid crystal layer with the upper electrode; the second substrate includes a counter electrode opposed to the upper electrode and the lower electrode, the counter electrode generating a vertical field across the liquid crystal layer with the upper electrode and the lower electrode; the pixel is capable of switchably presenting a black displaying state of performing black displaying with a vertical field generated across the liquid crystal layer, a white displaying state of performing white displaying with a lateral field generated across the liquid crystal layer, or a transparent displaying state in which a rear face side of the liquid crystal display panel is visible in a see-through manner with no voltage being applied to the liquid crystal layer; the upper electrode includes a plurality of branch portions extending along a predetermined direction, and at least one slit interposed between two mutually adjacent branch portions among the plurality of branch portions; each of the plurality of branch portions has a width L which is equal to or greater than a width S of each of the at least one slit; one vertical scanning period includes at least one write period in which a displaying voltage is written to the pixel; a vertical scanning period is designated a first vertical scanning period, and a vertical scanning period that immediately follows the first vertical scanning period is designated a second vertical scanning period, and (A) when the first vertical scanning period and the second vertical scanning period are to display a same gray scale level and the pixel is to perform white displaying in the second vertical scanning period, the second vertical scanning period includes a write period in which a first potential difference V1 which is 60% or less of a potential difference V0 between the lower electrode and the counter electrode in the black displaying state is to be given to the upper electrode and the lower electrode, (B) when the first vertical scanning period and the second vertical scanning period are to display different gray scale levels and the pixel is to perform white displaying in the second vertical scanning period, the second vertical scanning period includes a write period in which a second potential difference V2 being greater than the first potential difference V1 is to be given to the upper electrode and the lower electrode; in a write period in which the first potential difference V1 is to be given to the upper electrode and the lower electrode, substantially same potential as that of the counter electrode given to the upper electrode, and a different potential from that of the counter electrode is given to the lower electrode; and in a write period in which the second potential difference V2 is to be given to the upper electrode and the lower electrode, substantially a same potential as that of the counter electrode is given to the lower electrode, and a different potential from that of the counter electrode is given to the upper electrode.

Another liquid crystal display device according to an embodiment of the present invention is a liquid crystal display device comprising a liquid crystal display panel and having a pixel, the liquid crystal display panel including a first substrate and a second substrate opposed to each other and a liquid crystal layer interposed between the first substrate and the second substrate, wherein, the first substrate includes an upper electrode provided for the pixel, and a lower electrode disposed under the upper electrode via an insulating layer, the lower electrode generating a lateral field across the liquid crystal layer with the upper electrode; the second substrate includes a counter electrode opposed to the upper electrode and the lower electrode, the counter electrode generating a vertical field across the liquid crystal layer with the upper electrode and the lower electrode; the pixel is capable of switchably presenting a black displaying state of performing black displaying with a vertical field generated across the liquid crystal layer, a white displaying state of performing white displaying with a lateral field generated across the liquid crystal layer, or a transparent displaying state in which a rear face side of the liquid crystal display panel is visible in a see-through manner with no voltage being applied to the liquid crystal layer; the upper electrode includes a plurality of branch portions extending along a predetermined direction, and at least one slit interposed between two mutually adjacent branch portions among the plurality of branch portions; each of the plurality of branch portions has a width L which is smaller than a width S of each of the at least one slit; one vertical scanning period includes at least one write period in which a displaying voltage is written to the pixel; a vertical scanning period is designated a first vertical scanning period, and a vertical scanning period that immediately follows the first vertical scanning period is designated a second vertical scanning period, and (A) when the first vertical scanning period and the second vertical scanning period are to display a same gray scale level and the is to perform white displaying in the second vertical scanning period, the second vertical scanning period includes a write period in which a first potential difference V1 which is 60% or less of a potential difference V0 between the lower electrode and the counter electrode in the black displaying state is to be given to the upper electrode and the lower electrode, (B) when the first vertical scanning period and the second vertical scanning period are to display different gray scale levels and the pixel is to perform white displaying in the second vertical scanning period, the second vertical scanning period includes a write period in which a second potential difference V2 being greater than the first potential difference V1 is to be given to the upper electrode and the lower electrode; in a write period in which the first potential difference V1 is to be given to the upper electrode and the lower electrode, substantially a same potential as that of the counter electrode is given to the lower electrode, and a different potential from that of the counter electrode is given to the upper electrode; and in a write period in which the second potential difference V2 is to be given to the upper electrode and the lower electrode, substantially a same potential as that of the counter electrode is given to the lower electrode, and a different potential from that of the counter electrode is given to the upper electrode.

In one embodiment, one vertical scanning period includes two said write periods; and in case (B), in each of a first-occurring write period and a second-occurring write period in the second vertical scanning period, the second potential difference V2 is given to the upper electrode and the lower electrode.

In one embodiment, one vertical scanning period includes two said write periods; and in case (A), in each of a first-occurring write period and a second-occurring write period in the second vertical scanning period, the first potential difference V1 is given to the upper electrode and the lower electrode.

In one embodiment, one vertical scanning period includes two said write periods; and in case (A), the second potential difference V2 is given to the upper electrode and the lower electrode in a first-occurring write period in the second vertical scanning period, and the first potential difference V1 is given to the upper electrode and the lower electrode in a second-occurring write period in the second vertical scanning period.

In one embodiment, the second potential difference V1 is 80% or more of the potential difference V0 in the black displaying state.

In one embodiment, the second potential difference V2 is substantially equal to the potential difference V0 in the black displaying state.

In one embodiment, the first potential difference V1 is 54% or less of the potential difference V0 in the black displaying state.

In one embodiment, the first potential difference V1 is 47% or less of the potential difference V0 in the black displaying state.

In one embodiment, the first potential difference V1 is 30% or more of the potential difference V0 in the black displaying state.

In one embodiment, in the transparent displaying state, liquid crystal molecules in the liquid crystal layer take a twist alignment.

In one embodiment, in the white displaying state and in the transparent displaying state, liquid crystal molecules near a center of the liquid crystal layer along a thickness direction are aligned so as to be substantially orthogonal to the predetermined direction.

In one embodiment, the liquid crystal layer comprises liquid crystal molecules having positive dielectric anisotropy.

One embodiment further comprises an illumination element capable of switchably irradiating the liquid crystal display panel with a plurality of color rays including red light, green light, and blue light, the liquid crystal display device performing multicolor displaying by a field sequential method.

In one embodiment, the liquid crystal display panel includes no color filters.

Advantageous Effects of Invention

According to an embodiment of the present invention, there is provided a liquid crystal display device which excels in both stability of alignment and response characteristics and is suitably used as a see-through display.

BRIEF DESCRIPTION OF DRAWINGS

FIG. 7 A cross-sectional view showing an aliment of liquid crystal molecules 31 in an intermediate level displaying state of the liquid crystal display device 100.

FIG. 8 A cross-sectional view schematically showing a liquid crystal display device 800 according to Comparative Example, where (a) illustrates a state of performing black displaying, and (b) illustrates a state of performing white displaying.

FIG. 13 (a) and (b) are graphs for explaining a mechanism by which an abnormal change in alignment may occur.

FIG. 34 A cross-sectional view schematically showing a liquid crystal display device 100' according to an embodiment of the present invention.

FIG. 35 A plan view schematically showing a liquid crystal display device 100' according to an embodiment of the present invention.

FIG. 36 (a) and (b) are a cross-sectional view and a plan view showing an alignment of liquid crystal molecules 31 in a black displaying state of the liquid crystal display device 100'.

DESCRIPTION OF EMBODIMENTS

Hereinafter, with reference to the drawings, embodiments of the present invention will be described. Note that the present invention is not limited to the embodiments described below.

Embodiment 1

Figure 1:
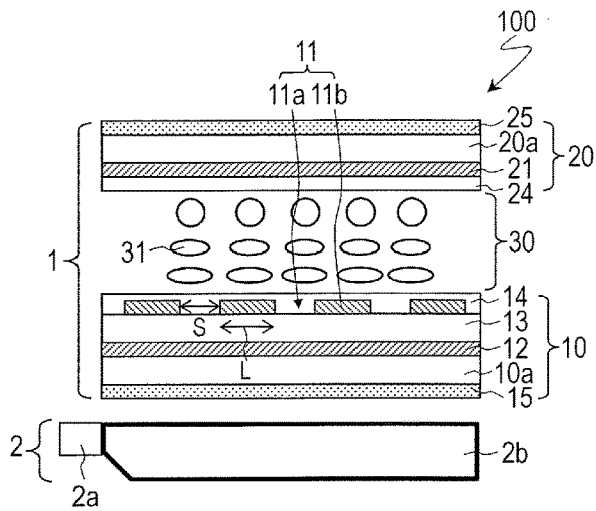
FIG. 1 A cross-sectional view schematically showing a liquid crystal display device 100 according to an embodiment of the present invention.
Figure 2:
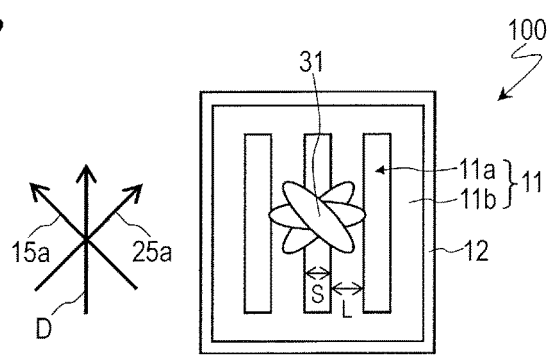
FIG. 2 A plan view schematically showing a liquid crystal display device 100 according to an embodiment of the present invention.

With reference to FIG. 1 and FIG. 2, a liquid crystal display device 100 according to the present embodiment will be described. FIG. 1 is a cross-sectional view schematically showing the liquid crystal display device 100, and FIG. 2 is a plan view schematically showing the liquid crystal display device 100.

As shown in FIG. 1, the liquid crystal display device 100 includes a liquid crystal display panel 1 and an illumination element 2. Moreover, the liquid crystal display device 100 includes a plurality of pixels arranged in a matrix array. As will be described later, the liquid crystal display device 100 performs multicolor displaying by the field sequential method.

The liquid crystal display panel 1 includes a first substrate 10 and a second substrate 20 opposing each other, and a liquid crystal layer 30 interposed between the first substrate 10 and the second substrate 20. Hereinafter, between the first substrate 10 and the second substrate 20, the first substrate 10 being positioned relatively on the rear face side will be referred to as the "rear substrate", and the second substrate 20 being positioned relatively on the front face side (the viewer's side) will be referred to as the "front substrate".

The rear substrate 10 includes a first electrode 11 provided for each of the plurality of pixels and a second electrode 12 which cooperates with the first electrode 11 to generate a lateral field across the liquid crystal layer 30. Via an insulating layer 13, the first electrode 11 is located on the second electrode 12. State otherwise, the second electrode 12 is located under the first electrode 11 via the insulating layer 13. Hereinafter, between the first electrode 11 and the second electrode 12, the first electrode 11 taking a relatively upper position will be referred to as the "upper electrode", and the second electrode 12 taking a relatively lower position will be referred to as the "lower electrode". The lower electrode 12, insulating layer 13, and the upper electrode 11 are supported by an insulative transparent substrate (e.g., a glass substrate) 10a.

As shown in FIG. 1 and FIG. 2, the upper electrode 11 includes: a plurality of branch portions (combteeth) 11b extending along a predetermined direction D; and at least one slit 11a interposed between two mutually adjacent branch portions 11b among the plurality of branch portions 11b. Since the at least one slit 11a extends along the direction D that the plurality of branch portions 11b extend, the direction D will hereinafter be referred to also as the "slit direction". Note that the numbers of slits 11a and branch portions 11b are not limited to the examples illustrated in FIG. 1 and FIG. 2. In the present embodiment, the branch portions 11b have a width L which is greater than the width S of the slit (s) 11a (i.e., L>S). The upper electrode 11 is made of a transparent electrically conductive material (e.g., ITO).

The lower electrode 12 has no slits. That is, the lower electrode 12 is a so-called spread electrode. The lower electrode 12 is made of a transparent electrically conductive material (e.g., ITO).

There is no particular limitation as to the material of the insulating layer 13. As the material of the insulating layer 13, for example, an inorganic material such as silicon oxide ($SiO_2$) or silicon nitride ($SiN_x$), or an organic material such as a photo-sensitive resin can be used.

The front substrate 20 includes a third electrode (hereinafter referred to as the "counter electrode") 21 which opposes the upper electrode (first electrode) 11 and the lower electrode (second electrode) 12. The counter electrode 21 is supported by an insulative transparent substrate (e.g., a glass substrate) 20a.

The counter electrode 21 generates a vertical field across the liquid crystal layer 30 in cooperation with the upper electrode 11 and the lower electrode 12. The counter electrode 21 is made of a transparent electrically conductive material (e.g., ITO).

Although not shown in FIG. 1, a dielectric layer (overcoat layer) may be formed on the counter electrode 21. The overcoat layer is to be provided in order to weaken a vertical field which will inevitably occur when a lateral field is generated. The overcoat layer 22 may be made of a photo-sensitive resin, for example.

The liquid crystal layer 30 contains liquid crystal molecules 31 having positive dielectric anisotropy. In other words, the liquid crystal layer 30 is made of a positive type liquid crystal material that the orientation directions of the liquid crystal molecules 31 shown in FIG. 1 and FIG. 2 are those in a state where no voltage is applied to the liquid crystal layer 30.

The liquid crystal display panel 1 further includes a pair of horizontal alignment films 14 and 24 which oppose each other via the liquid crystal layer 30. One (which hereinafter may be referred to as the "first horizontal alignment film") 14 of the pair of horizontal alignment films 14 and 24 is formed on a surface of the rear substrate 10 that faces the liquid crystal layer 30. The other (which hereinafter may be referred to as the "second horizontal alignment film") 24 of the pair of horizontal alignment films 14 and 24 is formed on a surface of the front substrate 20 that faces the liquid crystal layer 30.

The first horizontal alignment film 14 and the second horizontal alignment film 24 have each been subjected to an alignment treatment, thus possessing an alignment regulating force that causes the liquid crystal molecules 31 in the liquid crystal layer 30 to be aligned in a predetermined direction (called a "pretilt direction"). As the alignment treatment, for example, a rubbing treatment or a photo-alignment treatment is conducted.

The pretilt direction defined by each of the first horizontal alignment film 14 and the second horizontal alignment film 24 is set so that the liquid crystal molecules 31 will take a twist alignment in a state where no voltage is applied to the liquid crystal layer 30 (i.e., a state where no electric field is generated). Specifically, the pretilt direction defined by each of the first horizontal alignment film 14 and the second horizontal alignment film 24 constitutes an angle of substantially 45° with the slit direction D. Moreover, the pretilt direction that is defined by the second horizontal alignment film 24 constitutes an angle of 90° with the pretilt direction that is defined by the first horizontal alignment film 14. Therefore, in a state where no voltage is applied to the liquid crystal layer 30, the liquid crystal molecules 31 take a 90° twisted alignment.

Moreover, the liquid crystal display panel 1 further includes a pair of polarizing plates 15 and 25 which oppose each other via the liquid crystal layer 30. A transmission axis (polarization axis) 15a of one (which hereinafter may be referred to as the "first polarizing plate") 15 of the pair of polarizing plates 15 and 25 is substantially orthogonal to a transmission axis (polarization axis) 25a of the other (which hereinafter may be referred to as the "second polarizing plate") 25, as shown in FIG. 2. In other words, the first polarizing plate 15 and the second polarizing plate 25 are placed in crossed Nicols. The respective transmission axes 15a and 25a of the first polarizing plate 15 and the second polarizing plate 25 are substantially parallel or substantially orthogonal to the pretilt directions which are respectively defined by the first horizontal alignment film 14 and the second horizontal alignment film 24. Therefore, the respective transmission axes 15a and 25a of the first polarizing plate 15 and the second polarizing plate 25 constitute angles of substantially 45° with respect to the slit direction D.

The illumination element (referred to as the "backlight") 2 is located on the rear face side of the liquid crystal display panel 1. The illumination element 2 is able to switchably irradiate the liquid crystal display panel 1 with a plurality of color rays including red light, green light, and blue light.

As the illumination element 2, for example, an edgelight-type backlight such as that shown in FIG. 1 can be used. The edgelight-type backlight 2 includes a light source unit 2a and a light guide plate 2b. The light source unit 2a is capable of emitting a plurality of color rays including red light, green light, and blue light. For example, as light sources, the light source unit 2a includes a red LED, a green LED, and a blue LED. The light guide plate 2b guides color rays which are emitted from the light source unit 2a to the liquid crystal display panel 1.

The liquid crystal display device 100 performs multicolor displaying by the field sequential method. Therefore, the liquid crystal display panel 1 does not include any color filters.

When a predetermined voltage is applied between the upper electrode 11 and the lower electrode 12 (i.e., a predetermined potential difference is introduced therebetween), a lateral field (fringing field) is generated across the liquid crystal layer 30. A "lateral field" is an electric field containing a component which is substantially parallel to the substrate plane. The direction of the lateral field which is generated by the upper electrode 11 and the lower electrode 12 is substantially orthogonal to the slit direction D.

On the other hand, when a predetermined voltage is applied between the counter electrode 21 and the upper electrode 11 and lower electrode 12 (i.e., a predetermined potential difference is introduced therebetween), a vertical field is generated. A "vertical field" is an electric field whose direction is substantially parallel to the substrate-plane normal direction.

The liquid crystal display device 100 is constructed so that the intensities of the lateral field and the vertical field can be controlled with respect to each pixel. Typically, the liquid crystal display device 100 is constructed so that a voltage differing from pixel to pixel can be respectively supplied for the upper electrode 11 and the lower electrode 12. Specifically, both the upper electrode 11 and the lower electrode 12 are formed in isolated pieces corresponding to pixels, such that each pixel has a switching element (e.g., a thin film transistor; not shown) electrically connected to the upper electrode 11 and a switching element (e.g., a thin film transistor; not shown) electrically connected to the lower electrode 12. A predetermined voltage supplied to each of the upper electrode 11 and the lower electrode 12 via a corresponding switching element. Moreover, the counter electrode 21 is formed as a single electrically conductive film that is continuous across all pixels. Therefore, a common potential is applied to the counter electrode 21 for all pixels.

Figure 3:
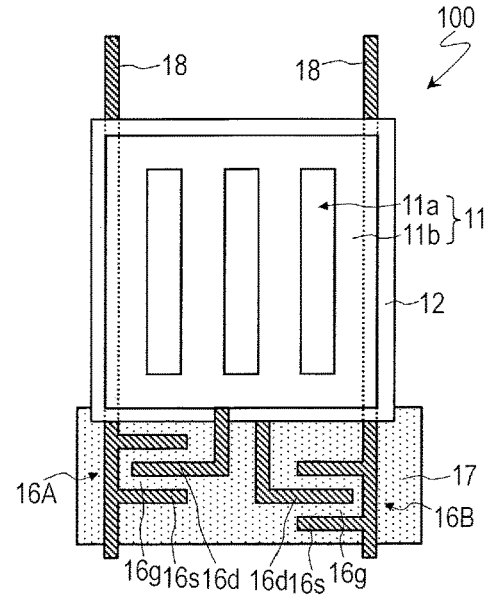
FIG. 3 A plan view showing an example of a specific wiring structure on a rear substrate 10 of the liquid crystal display device 100.

FIG. 3 shows an example of a specific wiring structure for the rear substrate 10. In the construction shown in FIG. 3, a first TFT 16A corresponding to the upper electrode 11 and a second TFT 16B corresponding to the lower electrode 12 are provided for each pixel.

The respective gate electrodes 16g of the first TFT 16A and the second TFT 16B are electrically connected to a gate bus line (scanning line) 17. Herein, the portions of the gate bus line 17 that overlap the channel regions of the first TFT 16A and the second TFT 16B function as the gate electrodes 16g. Respective source electrodes 16s of the first TFT 16A and the second TFT 16B are electrically connected to source bus lines (signal lines) 18. Herein, portions branching out from the source bus lines 18 function as the source electrodes 16s. A drain electrode 16d of the first TFT 16A is electrically connected to the upper electrode 11. On the other hand, a drain electrode 16d of the second TFT 16B is electrically connected to the lower electrode 12. Note that the wiring structure of the rear substrate 10 is not limited to what is exemplified in FIG. 3.

In the liquid crystal display device 100 of the present embodiment, each of the plurality of pixels is able to switchably present: a "black displaying state", where black displaying is performed with a vertical field being generated across the liquid crystal layer 30; a "white displaying state", where white displaying is performed with a lateral field being generated across the liquid crystal layer 30; or a "transparent is displaying state", where the rear face side (i.e., the background) of the liquid crystal display panel 1 is visible in a see-through manner with no voltage being applied to the liquid crystal layer 30.

Hereinafter, with reference to FIG. 4, FIG. 5 and FIG. 6, the black displaying state, the white displaying state, and the transparent displaying state will be described in more detail.

Figure 4:
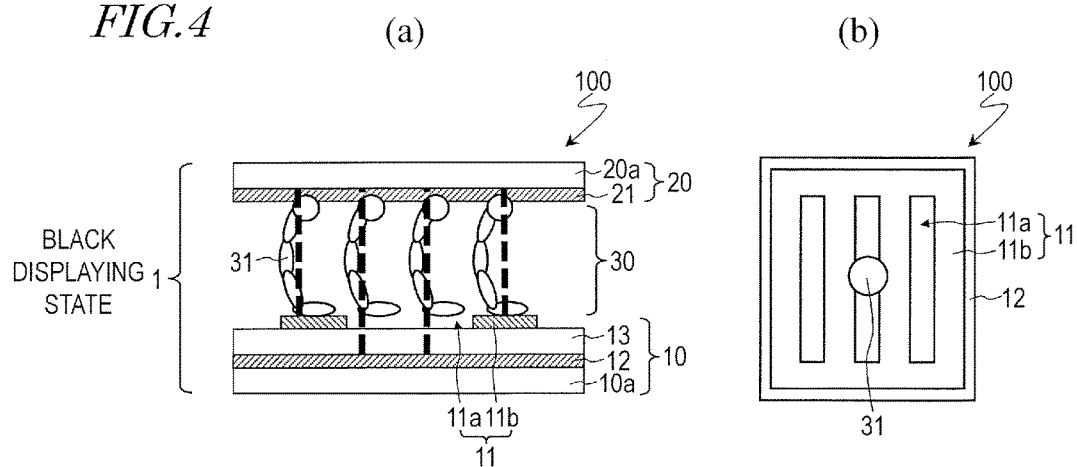
FIG. 4 (a) and (b) are a cross-sectional view and a plan view showing an alignment of liquid crystal molecules 31 in a black displaying state of the liquid crystal display device 100.

FIGS. 4(a) and (b) shows an alignment of liquid crystal molecules 31 in a black displaying state. In the black displaying state, a predetermined voltage is applied between the counter electrode 21 and the upper electrode 11 and lower electrode 12, whereby a vertical field is generated across the liquid crystal layer 30. FIG. 4 (a) schematically shows the electric lines of force in this state with broken lines.

In this black displaying state, as shown in FIGS. 4(a) and (b), the liquid crystal molecules 31 in the liquid crystal layer 30 are aligned substantially vertically to the substrate plane (the surfaces of the rear substrate 10 and the front substrate 20) (i.e., substantially parallel to the layer normal direction of the liquid crystal layer 30). Note that liquid crystal molecules 31 in the close neighborhood of the first horizontal alignment film 14 and the second horizontal alignment film 24 are strongly affected by the alignment regulating forces of the first horizontal alignment film 14 and the second horizontal alignment film 24, and therefore remain aligned substantially parallel to the substrate plane. However, since these liquid crystal molecules 31 are substantially parallel or substantially orthogonal to the transmission axis 15a of the first polarizing plate 15, they hardly confer any phase difference to the light passing through the first polarizing plate 15 and entering the liquid crystal layer 30, and thus hardly lower the contrast ratio.

Figure 5:
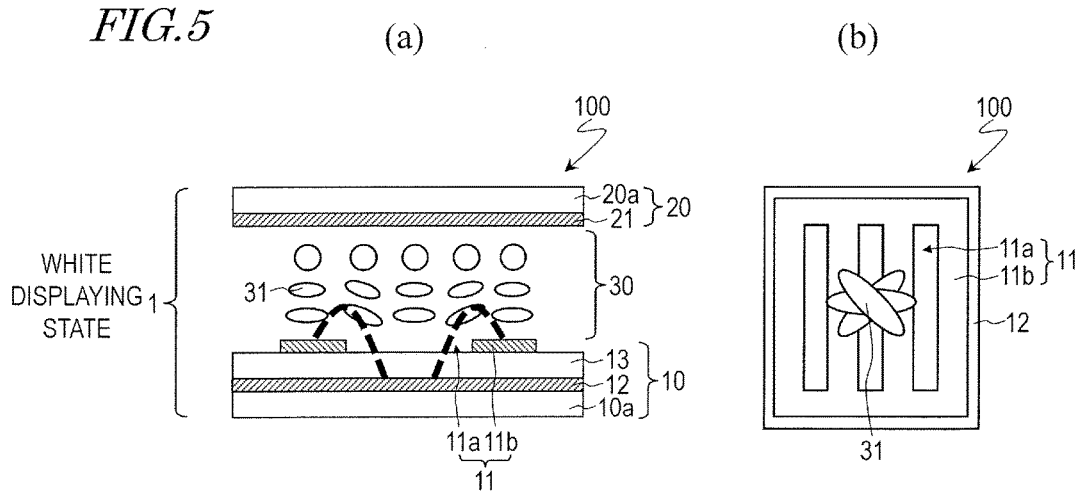
FIG. 5 (a) and (b) are a cross-sectional view and a plan view showing an alignment of liquid crystal molecules 31 in a white displaying state of the liquid crystal display device 100.
Figure 6:
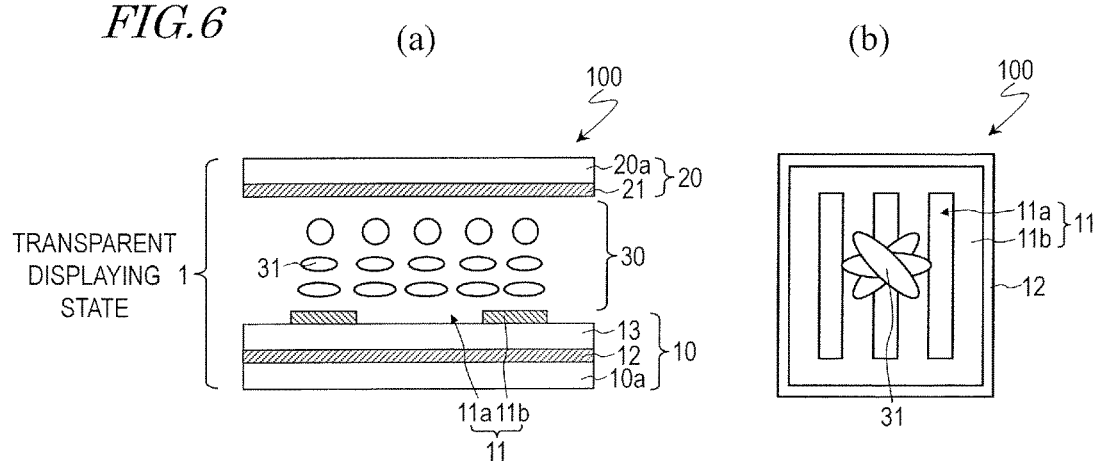
FIG. 6 (a) and (b) are a cross-sectional view and a plan view showing an alignment of liquid crystal molecules 31 in a transparent displaying state of the liquid crystal display device 100.

FIGS. 5(a) and (b) show an alignment of liquid crystal molecules 31 in the white displaying state. In the white displaying state, a predetermined voltage is applied between the upper electrode 11 and the lower electrode 12, thereby generating a lateral field (fringing field) across the liquid crystal layer 30. FIG. 5 schematically shows the electric lines of force in this state with broken lines.

In this white displaying state, as shown in FIGS. 5(a) and (b), the liquid crystal molecules 31 in the liquid crystal layer 30 are aligned substantially in parallel to the substrate plane (i.e., substantially vertically to the layer normal direction of the liquid crystal layer 30). More specifically, the liquid crystal molecules 31 in the neighborhood of first horizontal alignment film 14 and the liquid crystal molecules 31 in the neighborhood of second horizontal alignment film 24 are aligned so as to constitute an angle of substantially 90°, whereby the liquid crystal molecules 31 near the center along the thickness direction of the liquid crystal layer 30 are aligned substantially orthogonal to the direction (slit direction) D that the slits 11a of the upper electrode 11 extend. Therefore, an average orientation direction of the bulk liquid crystal is substantially orthogonal to the slit direction D (i.e., constituting an angle of substantially 45° with respect to the respective transmission axes 15a and 25a of the first polarizing plate 15 and the second polarizing plate 25).

FIGS. 6(a) and (b) show an alignment of liquid crystal molecules 31 in the transparent displaying state. In the transparent displaying state, no voltage is applied to the liquid crystal layer 30, so that neither a vertical field nor a lateral field is generated across the liquid crystal layer 30.

In this transparent displaying state, the liquid crystal molecules 31 in the liquid crystal layer 30 take a twist alignment, as shown in FIGS. 6(a) and (b). In other words, the liquid crystal molecules 31 are aligned substantially in parallel to the substrate plane (i.e., substantially vertically to the layer normal direction of the liquid crystal layer 30). The liquid crystal molecules 31 in the neighborhood of first horizontal alignment film 14 and the liquid crystal molecules 31 in the neighborhood of second horizontal alignment film 24 are aligned so as to constitute an angle of substantially 90°, whereby the liquid crystal molecules 31 near the center along the thickness direction of the liquid crystal layer 30 are aligned substantially orthogonal to the slit direction D. Therefore, an average orientation direction of the liquid crystal molecules 31 in the bulk liquid crystal are substantially orthogonal to the slit direction D (i.e., constituting an angle of substantially 45° with respect to the respective transmission axes 15a and 25a of the first polarizing plate 15 and the second polarizing plate 25). The light transmittance of each pixel of the liquid crystal display device 100 is the highest in this transparent displaying state (i.e., higher than those in the black displaying state and the white displaying state).

In addition to the aforementioned black displaying state, white displaying state, and transparent displaying state, each of the plurality of pixels of the liquid crystal display device 100 is able to present an "intermediate level displaying state" of presenting a luminance corresponding to an intermediate gray scale level, as shown in FIG. 7. In an intermediate level displaying state, desired transmittance can be realized by adjusting the intensity of a lateral field (fringing field) to be generated across the liquid crystal layer 30.

Thus, in the liquid crystal display device 100, when performing displaying such that information which is displayed by the liquid crystal display panel 1 is overlaid on the background. In this case, the pixels in a portion of the displaying region where the information is to be displayed present the black displaying state, the white displaying state, or an intermediate level displaying state, while the pixels in any other portion present the transparent displaying state. Switching between these displaying states may be conducted in the following manner, for example.

A driving circuit for a generic liquid crystal display device includes an 8-bit driver IC, and generates output voltages corresponding to 256 gray scale levels ($0^{th}$ to $255^{th}$ gray scale levels). In a generic liquid crystal display device, the $0^{th}$ gray scale level is assigned to the black displaying state; the $1^{st}$ to $254^{th}$ gray scale levels are assigned to intermediate level displaying states; and the $255^{th}$ gray scale level is assigned to the white displaying state.

In the liquid crystal display device 100 of the present embodiment, for example, the $0^{th}$ gray scale level may be assigned to the black displaying state, the $1^{st}$ to $253^{rd}$ gray scale levels assigned to intermediate level displaying states, the $254^{th}$ gray scale level assigned to the white displaying state, and the $255^{th}$ gray scale level assigned to the transparent displaying state, thereby being able to switch between the black displaying state, intermediate level displaying states, the white displaying state, and the transparent displaying state. Note that it is not necessary for the transparent displaying state to be associated with the $255^{th}$ gray scale level, and any gray scale level may be assigned to the transparent displaying state. In cases other than displaying in 256 gray scale levels exemplified herein, too, a specific gray scale level may be assigned to the transparent displaying state.

As described above, in the liquid crystal display device 100 of the present embodiment, which performs multicolor displaying by the field sequential method, the liquid crystal display panel 1 does not need color filters. As a result, the efficiency of light utilization is improved. In the liquid crystal display device 100, a vertical field is generated across the liquid crystal layer 30 in the black displaying state, and a lateral field is generated across the liquid crystal layer 30 in the white displaying Therefore, the torque due to voltage application acts on the liquid crystal molecules 31, at both a fall (a transition from the white displaying state to the black displaying state) and a rise (a transition from the black displaying state to the white displaying state). As a result, good response characteristics are attained.

Furthermore, in the liquid crystal display device 100 of the present embodiment, each pixel is capable of exhibiting not only the black displaying state and the white displaying state, but also the transparent displaying state, i.e., a state where no voltage is applied across the liquid crystal layer 30. By displaying the back round in this transparent displaying state, the problem of background blur (it being perceived as double images) can be prevented. Hereinafter, the reasons why this problem (doubling blur) occurs in the liquid crystal display devices of Patent Documents 1 to 3 will be described with reference to a liquid crystal display device of Comparative Example.

FIGS. 8(a) and (b) respectively illustrate a state of performing black displaying, and a state of performing white displaying, in a liquid crystal display device 800 according to Comparative Example. The liquid crystal display device 800 of Comparative Example is identical in construction to the liquid crystal display device shown in FIG. 1 and FIG. 2 of Patent Document 3.

The liquid crystal display device 800 includes an array substrate 810 and a counter substrate 820, and a liquid crystal layer 830 interposed therebetween. The array substrate 810 includes: a glass substrate 810a; and a lower electrode 812, an insulating layer 813, and a pair of interdigratated electrodes (upper electrodes) 817 and 818 which are stacked in this order on the glass substrate 810a. On the other hand, the counter substrate 820 includes a glass substrate 820a and a counter electrode 821 formed on the glass substrate 820a.

The liquid crystal layer 830 contains liquid crystal molecules 831 having positive dielectric anisotropy. In the liquid crystal display device 800, the liquid crystal molecules 831 in the liquid crystal layer 830 take a vertical alignment in the absence of an applied voltage.

In the liquid crystal display device 800 of Comparative Example, when performing black displaying, a predetermined voltage is applied between the counter electrode 821 and the lower electrode 812 and upper electrodes (pair of interdigitated electrodes) 817 and 818 (e.g., a potential of 7 V is given to the counter electrode 821, while a potential of 14 V is given to the lower electrode 812 and upper electrodes 817 and 818), thereby generating a vertical field across the liquid crystal layer 830. As a result, the liquid crystal molecules 831 are aligned substantially vertically to the substrate plane, as shown in FIG. 8(a).

Moreover, when displaying white displaying in the liquid crystal display device 800 of Comparative Example, a predetermined voltage is applied between the pair of interdigitated electrodes 817 and 818 (e.g., a potential of 0 V is given to one interdigitated electrode 817, while a potential of 14 V is given to the other interdigitated electrode 818), thereby generating a lateral field across the liquid crystal layer 830. As a result, the liquid crystal molecules 831 take an alignment which is inclined with respect to the substrate-plane normal direction, as shown in FIG. 8(b).

Figure 9:
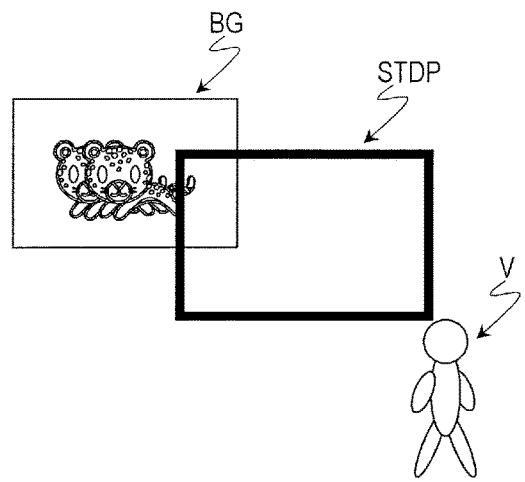
FIG. 9 A diagram schematically showing how a doubling blur may occur.

When the liquid crystal display device 800 of Comparative Example is straightforwardly used for a see-through display, it will be in the white displaying state, which is a state where the pixel has a high light transmittance, that the liquid crystal display device 800 will perform see-through displaying, i.e., displaying such the background is visible in a see-through manner. However, the state of performing white displaying is a state where the liquid crystal molecules 830 are aligned by applying a voltage across the liquid crystal layer 830, whereby a distribution of refractive indices will occur within the pixel. Owing to this refractive index distribution, light L from the rear face side is scattered (i.e., the direction of travel of the light altered; see FIG. 8(b)), thus blurring the background. Consequently, as shown in FIG. 9, the background will be perceived as double images by a viewer V observing the background BG via the see-through display STDP.

Thus, when see-through displaying is performed in the white displaying state, which is state where a voltage is applied across the liquid crystal layer, a doubling blur will occur. On the other hand, the liquid crystal display device 100 of the present embodiment displays the background (see-through displaying) in a pixel wish no voltage being applied across the liquid crystal layer 30 (a transparent displaying state), so that the viewer observing the background through the liquid crystal display device 100 will vividly perceive the background. As a result, doubling blurs will be prevented, whereby the quality of see-through displaying is improved.

As has already been described, in the liquid crystal display device of Patent Document 4, there is a trade-off between stability of alignment and response characteristics. Specifically, during white displaying (or intermediate level displaying), merely increasing the potential difference to be conferred between the upper electrode 11 and the lower electrode 12 so as to give priority to response characteristics will allow abnormal changes in alignment to occur, whereby the alignment will become unstable or, if the potential difference to be conferred between the upper electrode 11 and the lower electrode 12 is decreased so as no give priority to stability of alignment, then the response characteristics will be degraded.

On the other hand, the liquid crystal display device 100 of the present embodiment has a construction as described below, thereby excelling in both stability of alignment and response characteristics.

In the liquid crystal display device 100 of the present embodiment, one vertical scanning period includes at least one "write period" in which a displaying voltage is written to the pixel. As will be described later, in order to reduce the influence of step response, it is preferable that one vertical scanning period includes a plurality of (typically two) write periods.

Herein, a given vertical scanning period may be designated a "first vertical scanning period", and a vertical scanning period that immediately follows the first vertical scanning period a "second vertical scanning period". In the following, the first vertical scanning period may also be referred to as the "previous vertical scanning period", and the second vertical scanning period as the "current vertical scanning period".

In the liquid crystal display device 100 of the present embodiment, the voltage to be applied across the liquid crystal layer 30 in the second vertical scanning period may be varied depending on whether it is (hereinafter referred to as "case (A)") when the first vertical scanning period and the second vertical scanning period are to display the same gray scale level and the pixel is to perform white displaying in the second vertical scanning period, or (hereinafter referred to as "case (B)") when the first vertical scanning period and the second vertical scanning period are to display different gray scale levels and the pixel is to perform white displaying in the second vertical scanning period.

Specifically, in case (A), the second vertical scanning period includes a write period in which a first potential difference V1 which is 60% or less of a potential difference V0 between the lower electrode 11 and the counter electrode 21 in the black displaying state is to be given to the upper electrode 11 and the lower electrode 12. In case (B), the second vertical scanning period includes a write period in which a second potential difference V2 being greater than the first potential difference V1 (i.e., greater than 60% of the potential difference V0) is given to the upper electrode 11 and the lower electrode 12.

Thus, the second vertical scanning period (current vertical scanning period) includes: in case (A), a write period in which a relatively small first potential difference V1 is to be given to the upper electrode 11 and the lower electrode 12; and in case (B), a write period in which a relative large second potential difference V2 is to be given to the upper electrode 11 and the lower electrode 12.

In case (A), i.e., when the same gray scale level is to be displayed in the previous vertical scanning period and the current vertical scanning period, it is preferable to give priority to stability of alignment. Therefore, in case (A), a write is performed with a relatively small first potential difference V1 in the current vertical scanning period, whereby abnormal changes in alignment can be prevented. Hereinafter, the first potential difference V1 may be referred to as the "normal driving voltage". As has already been described, the first potential difference V1 is 60% or less of the potential difference (which hereinafter may be referred to as the "black displaying voltage") V0 between the lower electrode 11 and the counter electrode 21 in the black displaying state. A result of studying prevention of abnormal changes in alignment based on the first potential difference V1 being 60% or less of the black displaying voltage V0 will be described in detail later.

In case (B), i.e., when different gray scale levels are to be displayed in the previous vertical scanning period and the current vertical scanning period, it is not necessary to give much priority to stability of alignment. Therefore, in case (B), a write is performed with a relatively large second potential difference in the current vertical scanning period, whereby response characteristics can be improved. Hereinafter, the second potential difference V2 will be referred to as the "overdrive driving voltage".

As described above, in the liquid crystal display device 100 of the present embodiment, the current vertical scanning period includes in case (A) a write period in which a write is to be performed with the normal driving voltage V1, and in case (B) a write period in which a write is to be performed with the overdrive driving voltage V2, whereby the liquid crystal display device 100 excels in both stability of alignment and response characteristics.

Now, a result of studying prevention of abnormal changes in alignment by applying the normal driving voltage V1 will be described.

Figure 10:
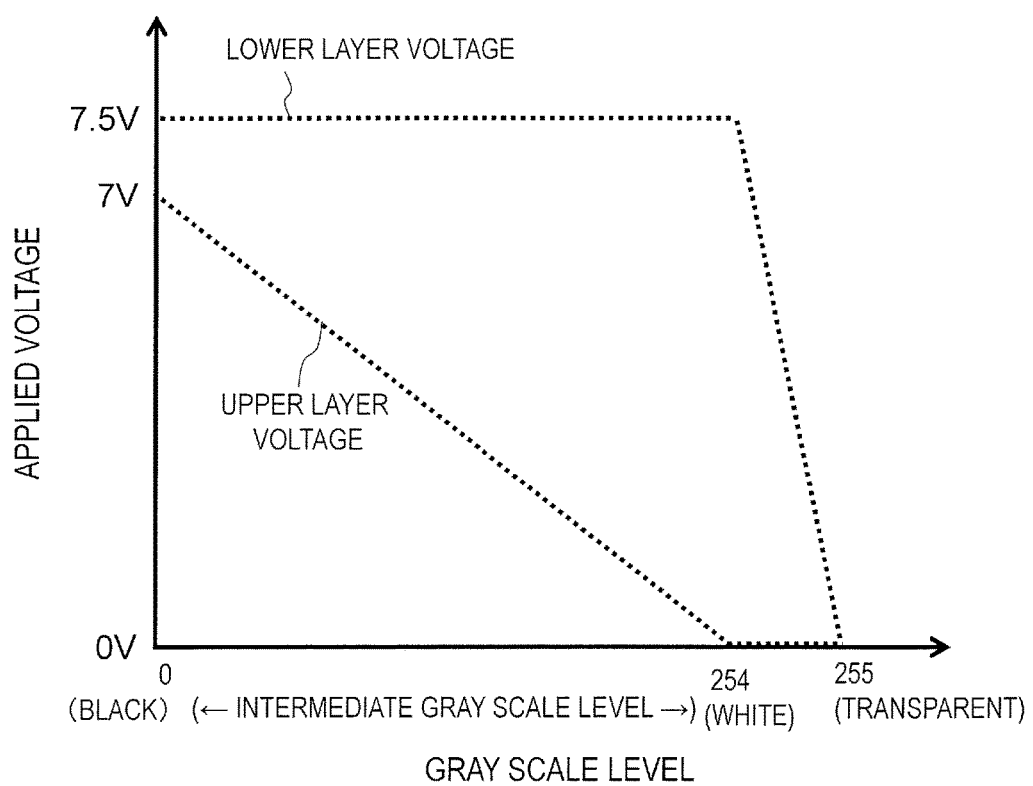
FIG. 10 A graph showing an exemplary voltage setting (a relationship between an upper layer voltage and a lower layer voltage and the gray scale level) which gives priority to response characteristics.

A vigorous study by the inventors has found out that simply setting the applied voltage to the upper electrode 11 (hereinafter referred to as the "upper layer voltage") and the applied voltage of the lower electrode 12 (hereinafter referred to as the "lower layer voltage") may allow an abnormal change in alignment to occur when the gray scale level changes. FIG. 10 shows an exemplary voltage setting (a relationship between an upper layer voltage and a lower layer voltage and the gray scale level) which gives priority to response characteristics. Although not shown in FIG. 10, the applied voltage (counter voltage) to the counter electrode 21 is 0 V across all gray scale levels.

In the example shown in FIG. 10, as the gray scale level increases from the $0^{th}$ gray scale level (corresponding to the black displaying state) to the $254^{th}$ gray scaled level (corresponding to the white displaying state), the upper layer voltage decreases while the lower layer voltage remains constant. Specifically, while the lower layer voltage remains at 7.5 V, the upper layer voltage chances (lowers) from 7 V to 0 V. At the $255^{th}$ gray scale level (corresponding to the transparent displaying state), not only the upper layer voltage but also the lower layer voltage becomes 0 V. In this example, there exists a gray scale level at which the potential difference between the upper electrode 11 and the lower electrode 12 is 60% or greater of the potential difference between the lower electrode 12 and the counter electrode 21 in the black displaying state. When the voltage setting shown in FIG. 10 is adopted, an abnormal change in alignment may occur when the gray scale level changes.

Figure 11:
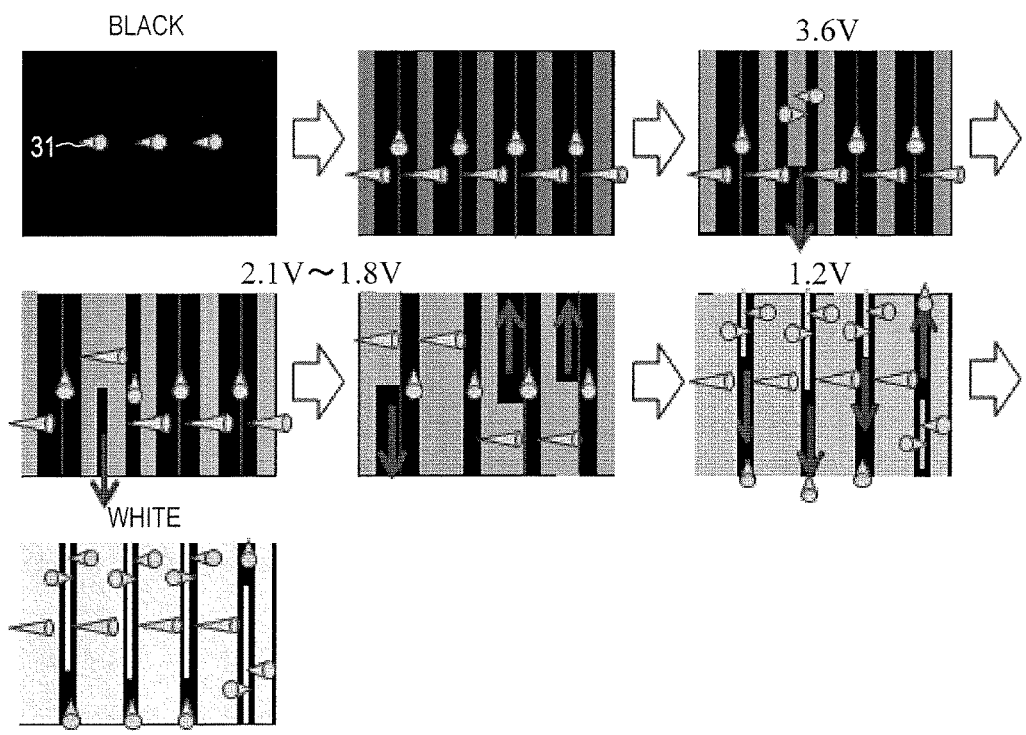
FIG. 11 A diagram schematically showing changes in alignment from the black displaying state, through intermediate level displaying states, to the white displaying state, in the case of adopting a voltage setting shown in FIG. 10.

FIG. 11 is a diagram schematically showing changes in alignment from the black displaying state, through intermediate level displaying states, to the white displaying state, in the case of adopting a voltage setting shown in FIG. 10. As can be seen from FIG. 11, as the gray scale level becomes higher, not only the normally aligned liquid crystal molecules 31, but also liquid crystal molecules 31 which are twisted in an opposite manner to their natural twist direction, and liquid crystal molecules 31 which are tilted in an opposite manner to their natural tilt direction will emerge.

Figure 12:
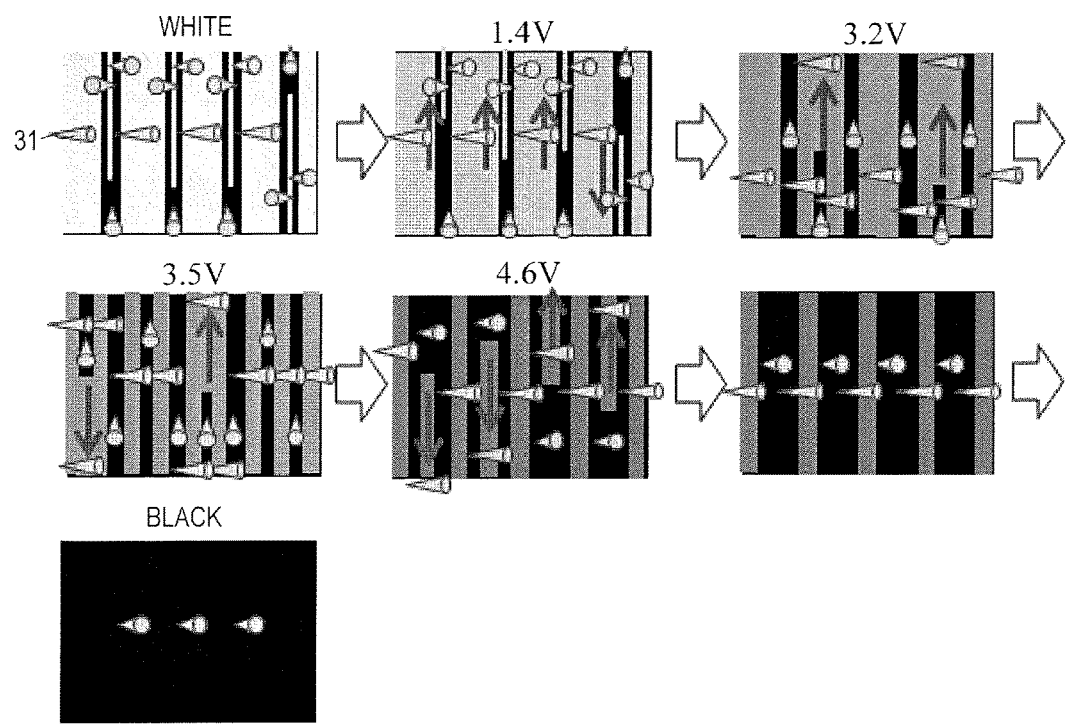
FIG. 12 A diagram schematically changes in alignment from the white displaying state, through intermediate level displaying states, to the black displaying state, in the case of adopting the voltage setting shown in FIG. 10.

FIG. 12 is a diagram schematically changes in alignment from the white displaying state, through intermediate level displaying states, to the black displaying state. As can be seen from FIG. 12, as the gray scale level becomes lower, liquid crystal molecules 31 of the opposite twist and liquid crystal molecules 31 of the opposite tilt are decreased.

Thus, when a voltage setting as shown in FIG. 10 is adopted, an abnormal change in alignment may occur when the gray scale level changes. FIG. 11 and FIG. 12 illustrate how white lines and black lines may grow due to such abnormal changes in alignment. The rate of change of abnormal changes in alignment is at a visually recognizable level (several hundred ms to several s). Moreover, a variety in magnitude of the abnormal changes in alignment, within the pixel and/or from pixel to pixel, will be observed as display unevenness or coarseness, thus causing a decrease in display quality.

Now, with reference to FIGS. 13(a) and (b), the inventors' view concerning the mechanism which causes abnormal changes in alignment will be described. The cause of abnormal changes in alignment is considered to be local mismatchings between the alignment regulating force by a lateral field (fringing field) that is generated by the potential difference between the upper electrode 11 and the lower electrode 12 and the alignment regulating forces by the horizontal alignment films 14 and 24. Thus, as the gray scale level increases from the black displaying state to the white displaying state, as shown in FIG. 13(a), the potential difference between the upper electrode 11 and the lower electrode 12 exceeds a certain threshold value, beyond which an abnormal change in alignment occurs (herein referred to as a "set"). As the gray scale level decreases from the white displaying state to the black displaying state, as shown in FIG. 13(b), the abnormal change in alignment is eliminated (herein referred to as a "reset").

Figure 14:
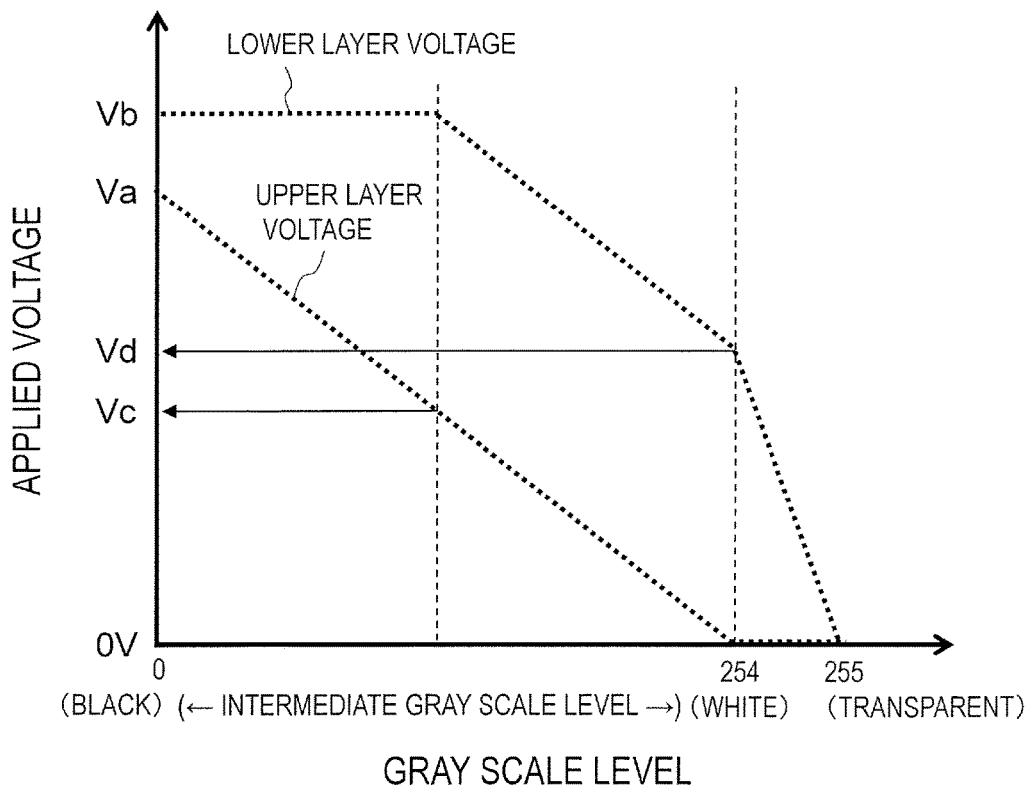
FIG. 14 A graph showing an exemplary setting of an upper layer voltage and a lower layer voltage that suppresses abnormal changes in alignment.

FIG. 14 shows an exemplary setting of an upper layer voltage and a lower layer voltage that suppresses abnormal chances in alignment. In the example shown in FIG. 14, the potential difference between the upper electrode 11 and the lower electrode 12 is set so as not to exceed a certain threshold value. That is, the potential difference between the upper electrode 11 and the lower electrode 12 at each gray scale level from the lowest gray scale level to the highest gray scale level is a predetermined ratio or less (specifically, 60% or less) of the potential difference V0 between the lower electrode 12 and the counter electrode 21 in the black displaying state.

In the example shown in FIG. 14, the applied voltage to the upper electrode 11 decreases as the gray scale level increases from the lowest gray scale level to the gray scale level corresponding to the white displaying state. Specifically, as the gray scale level increases, the upper layer voltage decreases from Va (e.g. 7 V) to 0 V. On the other hand, the applied voltage of the lower electrode 12 remains constant from the lowest gray scale level to a certain intermediate gray scale level, and decreases as the gray scale level increases from that intermediate gray scale level to the gray scale level corresponding to the white displaying state. Specifically, the lower layer voltage remains at Vb (e.g. 7.5 V) from the lowest gray scale level to a certain intermediate gray scale level (a gray scale level at which the upper layer voltage is Vc), and as the gray scale level increases from that intermediate gray scale level to the gray scale level corresponding to the white displaying state, the lower layer voltage decreases by the same rate as the decrease in the upper layer voltage, from Vb to Vd. In other words, in this example, the potential difference between the upper electrode 11 and the lower electrode 12 is set at Vd or less, where Vd is 60% or less of the potential difference Vb between the lower electrode 12 and the counter electrode 21 in the black displaying state.

Now, with respect to a number of settings with different maximum potential differences between the upper electrode 11 and the lower electrode 12, results of studying whether abnormal changes in alignment are suppressed or not will be described. Table 1 below shows, with respect to each of Settings 1 to 5, an upper layer voltage and a lower layer voltage in the black displaying state, an upper layer voltage at which the lower layer voltage begins to be lowered (Vc in FIG. 14), an upper layer voltage and a lower layer voltage in the white displaying state (Vd in FIG. 14), and a result of checking via visual recognition whether abnormal changes in alignment are suppressed or not. In Table 1, "x" indicates that an abnormal change in alignment occurred; and "◯" indicates that abnormal changes T1 alignment were suppressed. "Δ" indicated that abnormal changes in alignment were basically suppressed, but abnormal changes in alignment occurred depending on how displaying was transitioned to the white displaying state. The studying results shown in Table 1 are directed to the case where the width S of the slits 11a in the upper electrode 11 is 3 μm; the width L of the branch portions 11b is 4 μm; and the liquid crystal material composing the liquid crystal layer 30 has a dielectric anisotropy Δε of 17.8.

TABLE 1

| | black displaying state | | upper layer voltage at which lower layer voltage begins to be lowered (V) | white displaying state | | suppression of abnormal changes in alignment |
|---|---|---|---|---|---|---|
| | upper layer voltage (V) | lower layer voltage (V) | | upper layer voltage (V) | lower layer voltage (V) | |
| Setting 1 | 7 | 7.5 | — | 0 | 7.5 | X |
| Setting 2 | | | 2 | | 5.5 | X |
| Setting 3 | | | 3 | | 4.5 | X |

TABLE 1-continued

| | black displaying state | | upper layer voltage at which lower layer voltage begins to be lowered (V) | white displaying state | | suppression of abnormal changes in alignment |
|---|---|---|---|---|---|---|
| | upper layer voltage (V) | lower layer voltage (V) | | upper layer voltage (V) | lower layer voltage (V) | |
| Setting 4 | | | 3.5 | | 4 | Δ |
| Setting 5 | | | 4 | | 3.5 | ○ |

As can be seen from Table 1, abnormal changes in alignment occurred under Settings 1, 2 and 3, in which the maximum potential difference between the upper electrode 11 and the lower electrode 12 (which is the same level as the lower layer voltage in the white displaying state) is 7.5 V, 5.5 V and 4.5 V. On the other hand, under Setting 4, in which the maximum potential difference between the upper electrode 11 and the lower electrode 12 is 4 V, abnormal changes in alignment were suppressed; and under Setting 5, in which the maximum potential difference between the upper electrode 11 and the lower electrode 12 is 3.5 V, abnormal changes in alignment were further suppressed.

Table 2 below shows, with reference to each of Settings 1 to 5, results of studying suppression of abnormal changes in alignment while the manner of transition to the white displaying state was varied. Table 2 shows studying results in the case of abruptly transitioning from the transparent displaying state to the white displaying state, in the case of abruptly transitioning from the black displaying state to the white displaying state, in the case of gradually transitioning from the black displaying state to the white displaying state, and is the case of gradually transitioning from the transparent displaying state to the white displaying state. In Table 2, "×" indicates that an abnormal change in alignment occurred; and "○" indicates that abnormal changes is alignment were suppressed.

TABLE 2

| manner of transition to white displaying state | lower layer voltage in white displaying state (=maximum potential difference between upper electrode and lower electrode) | | | | |
|---|---|---|---|---|---|
| | Setting 1: 7.5 V | Setting 2: 5.5 V | Setting 3: 4.5 V | Setting 4: 4 V | Setting 5: 3.5 V |
| abruptly from transparent displaying state | X | X | X | ○ | ○ |
| abruptly from black displaying state | X | X | X | ○ | ○ |
| gradually from black displaying state | X | X | X | X | ○ |
| gradually from transparent displaying state | X | X | X | X | ○ |

As can be seen from Table 2, under Settings 1 to 3, abnormal changes in alignment occurred regardless of the manner of transition. Under Setting 4, abnormal changes in alignment were suppressed in the case of abruptly transitioning from the transparent displaying state to the white displaying state and in the case of abruptly transitioning from the black displaying state to the white displaying state, but abnormal changes in alignment occurred in the case of gradually transitioning from the black displaying state to the white displaying state and in the case of gradually transitioning from the transparent displaying state to the white displaying state. On the other hand, under Setting 5, abnormal changes in alignment were suppressed regardless of the manner of transition.

Table 3 below shows results of studying suppression of abnormal changes in alignment while varying the specifications of the liquid crystal display panel 1. Table 3 shows, with respect to each of Specs 1 to 4, a dielectric anisotropy Δε of the liquid crystal material, a width L(μm) of the branch portions 11b and a width S(μm) of the slits 11a of upper electrode 11, and results of studying suppression of abnormal changes in alignment in the cases where the lower layer voltage in the white displaying state is 3 V, 3.5 V, 4 V and 4.5 V. Note that Spec 1 is the specifications whose studying results are given in Table 1. In Table 3, "×", "Δ" and "○" have the same meanings as those of "×", "Δ" and "○" in Table 1.

TABLE 3

| | Δε of liquid crystal material | L/S of upper electrode | lower layer voltage in white displaying state (=maximum potential difference between upper electrode and lower electrode) | | | |
|---|---|---|---|---|---|---|
| | | | 3 V | 3.5 V | 4 V | 4.5 V |
| Spec 1 | 17.8 | 4/3 | — | ○ | Δ | X |
| Spec 2 | | 5/3 | — | ○ | ○ | Δ |
| Spec 3 | | 3/5 | ○ | Δ | X | — |
| Spec 4 | 20 | 5/3 | — | ○ | Δ | — |

As shown in Table 3, when the maximum potential difference between the upper electrode 11 and the lower electrode 12 is 4.5 V, abnormal changes in alignment in Spec 2 can be suppressed. When the maximum potential difference is 4 V, abnormal changes in alignment in Specs 1, 2 and 4 can be suppressed; and when the maximum potential difference is 3.5 V, abnormal changes in alignment in all of Specs 1 to 4 can be suppressed.

It can be seen from the results that the normal driving voltage (first potential difference) V1 being 60% or less of the black displaying voltage V0 allows abnormal changes in alignment to be suppressed. From the standpoint of suppression of abnormal changes in alignment, the normal driving voltage V1 is more preferably 54% or less, and more preferably 47% or less, of the black displaying voltage V0.

If the normal driving voltage V1 is too small, the response speed might become too slow. Therefore, from the standpoint of response characteristics, it can be said that the normal driving voltage V1 is preferably as large as possible, so long as abnormal changes in alignment are suppressed. Specifically, the normal driving voltage V1 is preferably 30% or more, and more preferably 40% or more, of the black displaying voltage V0.

There is no particular limitation as to the level of the second potential difference (overdrive driving voltage) V2; it may be any level that is greater than the first potential difference (normal driving voltage) V1 (i.e., more than 60% of the black displaying voltage V0). However, from the standpoint of further improving response characteristics, the second potential difference V2 is preferably 80% or more of the black displaying voltage V0. The second potential difference V2 may be substantially equal to the black displaying voltage V0, for example (i.e., the voltage setting shown in FIG. 10).

In the case of performing white displaying, substantially the same potentials are given to one of the upper electrode 11 and the lower electrode 12 and to the counter electrode 21, while different potentials are given to the other one of the upper electrode 11 and the lower electrode 12 and to the counter electrode 21. In doing so, possible manners of voltage application may be: giving different potentials to the upper electrode 11 and the counter electrode 21 (i.e., giving substantially the same potentials to the lower electrode 12 and the counter electrode 21); and giving different potentials to the lower electrode 12 and the counter electrode 21 (i.e., giving substantially the same potential to the upper electrode 11 and the counter electrode 21). Hereinafter, giving the first potential difference V1 to the upper electrode 11 and the lower electrode 12 in the former manner may be expressed as "applying the normal driving voltage V1 to the upper electrode 11", and giving it in the latter manner may be expressed as "applying the normal driving voltage V1 to the lower electrode 12". Moreover, giving the second potential difference V2 to the upper electrode 11 and the lower electrode 12 in the former manner may be expressed as "applying the overdrive driving voltage V2 to the upper electrode 11", and giving it in the latter manner be expressed as "applying the overdrive driving voltage V2 to the lower electrode 12".

It has been found through a study by the inventors that different response characteristics result from these two manners, and that the preferable manner would differ depending on which one of the width L of the branch portions 11b and the width S of the slits 11a is greater or smaller, As has already been described, in the present embodiment, the width L of the branch portions 11b is greater than the width S of the slits 11a (i.e., L>S). Moreover, in a write period in which the first potential difference (normal driving voltage) V1 is given to the upper electrode 11 and the lower electrode 12, substantially the same potential as that of the counter electrode 21 is given to the upper electrode 11 while a different potential from that of the counter electrode 21 is given to the lower electrode 12. In other words, the normal driving voltage V1 is applied to the lower electrode 12. In a write period in which the second potential difference (overdrive driving voltage) V2 is given to the upper electrode 11 and the lower electrode 12, substantially the same potential as that of the counter electrode 21 is given to the lower electrode 12, while a different potential from that of the counter electrode 21 is given the upper electrode 11. In other words, the overdrive driving voltage V2 is applied to the upper electrode 11.

Thus, in a construction where the width L of the branch portions 11b is greater than the width S of the slits 11a, by applying the normal driving voltage V1 to the lower electrode 12 in making a write with the normal driving voltage V1 and applying the overdrive driving voltage V2 to the upper electrode 11 in making a write with the overdrive driving voltage V2, further improvements in response characteristics and/or brightness can be achieved. This will be described more specifically below.

In the case where multicolor displaying is performed by the field sequential method, the basis of backlight driving will be turning on the light source altogether, rather than so-called area-active driving, that is, dividing the displaying region into a number of regions and turning on the light source with respect to each region (i.e., luminance is controlled region by region).

Between the pixel row which was the first to be scanned and the pixel row which was the last to be scanned during one vertical scanning period, there is a time difference in the response of liquid crystal molecules. Therefore, if essentially all of one vertical scanning period (1 frame) were to be allocated to pixel scanning, it would be impossible to turn on the backlight with a timing that is not conducive to unevenness in brightness or intermixing of colors within the display surface. Therefore, it is preferable to complete scanning of all pixels as early as possible during one vertical scanning period, thus providing a period in which the backlight is turned on only after the liquid crystal molecules have sufficiently completed responding. Preferably, there is no overlap between the period of pixel scanning and the period of turning on the backlight, but they may be overlapped. The shorter the pixel scanning period is, the less the brightness unevenness and the like in the display surface will be. Specifically, when the pixel scanning period is 50% or less of the one vertical scanning period, brightness unevenness and the like in the display surface can be made adequately small and two writes can be made to each pixel within one vertical scanning period (i.e., two write periods can be provided).

In the case of the field sequential method, at least three vertical scanning periods are needed, namely, a vertical scanning period corresponding to red, a vertical scanning period corresponding to green, and a vertical scanning period corresponding to blue; in order to prevent flickering from being perceived, it is preferable that the driving frequency (frame rate) is 240 Hz or more, i.e., that the one vertical scanning period is about 4.2 msec or less. Therefore, order to make two writes, the response characteristics until the lapse of 2.1 msec since voltage application will be important.

Figure 15:
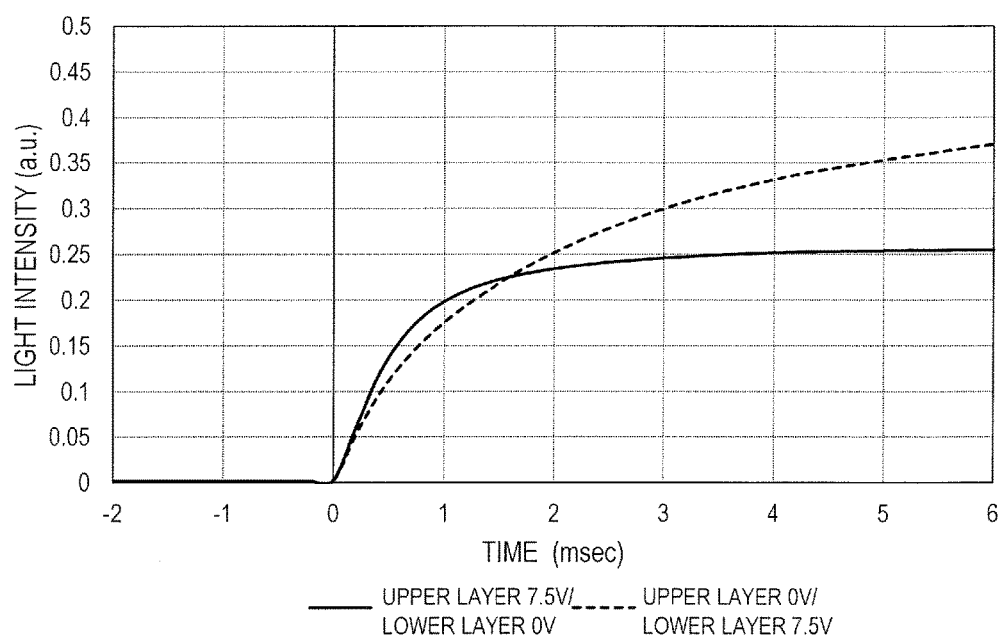
FIG. 15 A graph showing in a construction where branch portions 11b have a width L of 5 μm and slits 11a have a width S of 3 μm, a response waveform in the case where an upper electrode 11, a lower electrode 12, and a counter electrode 21 respectively have potentials of 7.5 V, 0 V and 0 V, and a response waveform in the case where these respectively are 0 V, 7.5 V and 0 V.
Figure 16:
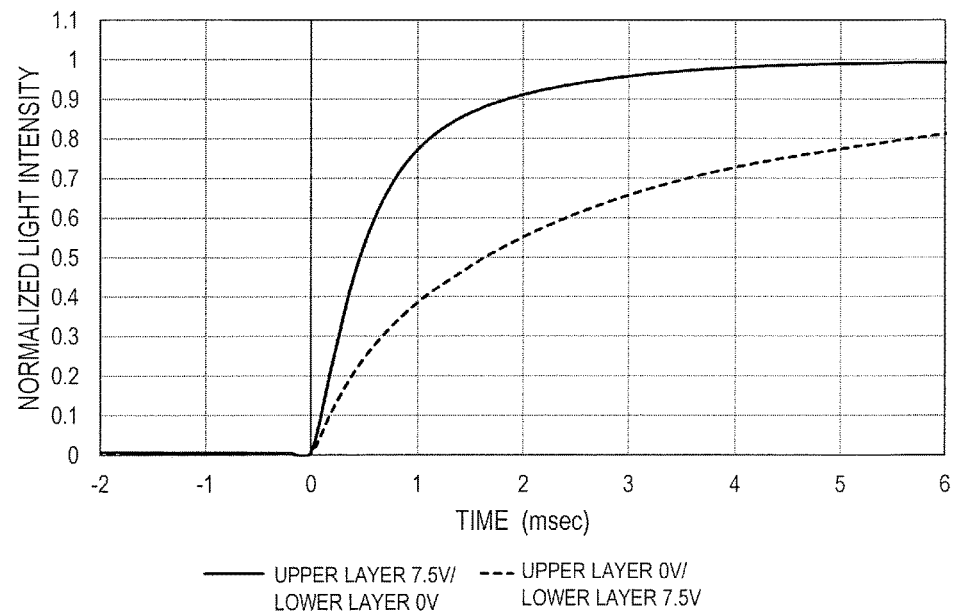
FIG. 16 A graph showing, in a construction where branch portions 11b have a width L of 5 μm and slits 11a have a width S of 3 μm, a response waveform in the case where an upper electrode 11, a lower electrode 12, and a counter electrode 21 respectively have potentials of 7.5 V, 0 V and 0 V, and a response waveform in the case where these respectively are 0 V, 7.5 V and 0 V.

FIG. 15 and FIG. 16 show a response waveform in the case where an upper electrode 11, a lower electrode 12, and a counter electrode 21 respectively have potentials of 7.5 V, 0 V and 0 V, and a response waveform in the case where these respectively are 0 V, 7.5 V and 0 V, in a construction where the branch portions 11b have a width L of 5 μm and the slits 11a have a width S of 3 μm (i.e., a construction where L>S). In FIG. 15, light intensity (a.u.) is taken on the vertical axis, whereas in FIG. 16, normalized light intensity (i.e., light intensity which is normalized by the finally-reached light intensity in each case) is taken on the vertical axis (in either case, time (msec) is taken on the horizontal axis).

As can be seen from FIG. 15 and FIG. 16, the final light intensity is higher in the case where the lower electrode 12 has a potential of 7.5 V, but the response speed during a comparatively short period after voltage application is faster in the case where the upper electrode 11 has a potential of 7.5 V. Therefore, it is more preferable to apply the overdrive driving voltage V2 to the upper electrode 11 than apply the overdrive driving voltage V2 to the lower electrode 12.

Figure 17:
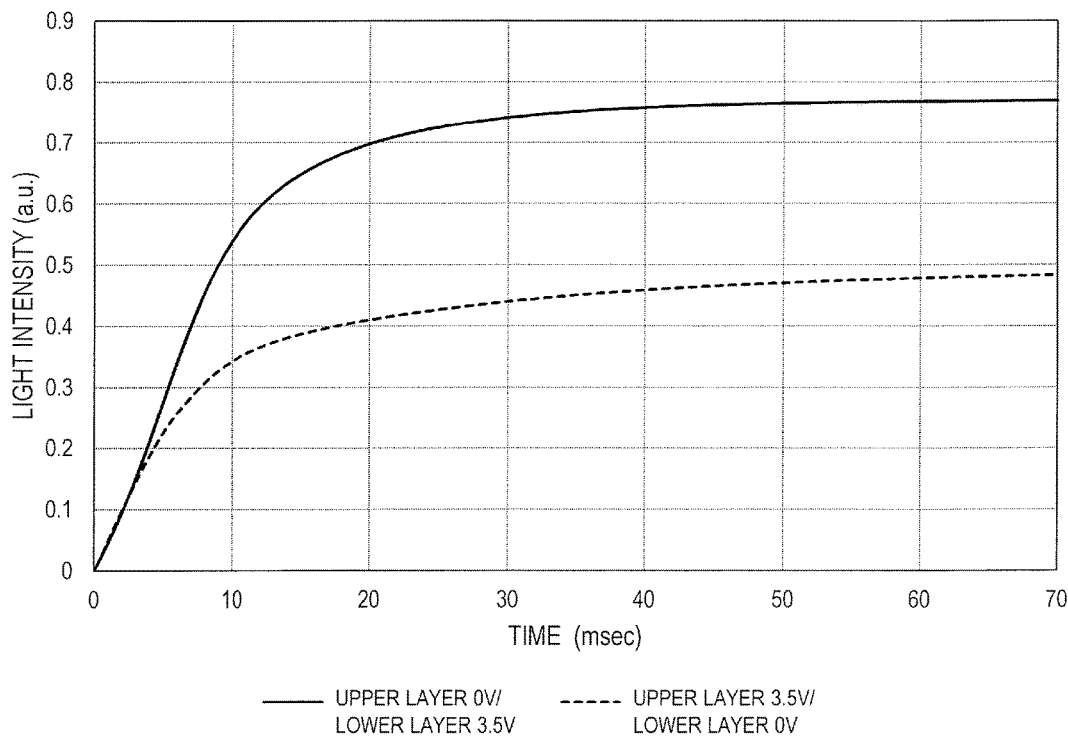
FIG. 17 A graph showing, in a construction where branch portions 11b have a width L of 5 μm and slits 11a have a width S of 3 μm, a response waveform in the case where an upper electrode 11, a lower electrode 12, and a counter electrode 21 respectively have potentials of 3.5 V, 0 V and 0 V, and a response waveform in the case where these respectively are 0 V, 3.5 V and 0 V.

FIG. 17 shows, with respect to the same construction (i.e., a construction such that L=5 μm, S=3 μm), a response waveform in the case where an upper electrode 11, a lower electrode 12, and a counter electrode 21 respectively have potentials of 3.5 V, 0 V and 0 V, and a response waveform in the case where these respectively are 0 V, 3.5 V and 0 V.

As can be seen from FIG. 17, the final light intensity is higher (i.e., brighter) in the case where the lower electrode 12 has a potential of 3.5 V than in the case where the upper electrode 11 has a potential of 3.5 V. Therefore, it is more preferable cc apply the normal driving voltage V1 to the lower electrode 12 than apply the normal driving voltage V1 to the upper electrode 11.

One vertical scanning period may include at least one write period for each pixel; however, when there is only one write period (one write), there will be a strong influence of step response. Step response is a phenomenon where, due to changes in the liquid crystal capacitor that are associated with liquid crystal response (i.e., changes in the alignment direction of liquid crystal molecules), the liquid crystal capacitor keeps changing during the retention period from immediately after the TFT of the pixel was turned OFF, whereby the applied voltage keeps changing from the level existing when the TFT was ON.

In order to reduce the influence of step response, it is preferable that one vertical scanning period includes two write periods (i.e., two writes are performed). For example, writes may be performed with the same voltage setting in a first-occurring write period and a second-occurring write period.

Specifically, in case (A), in each of a first-occurring write period and a second-occurring write period in the second vertical scanning period (current vertical scanning period), the first potential difference (normal driving voltage) V1 may be given to the upper electrode 11 and the lower electrode 12.

In case (B), in each of a first-occurring write period and a second-occurring write period in the second vertical scanning period (current vertical scanning period), the second potential difference (overdrive driving voltage) V2 may be given to the upper electrode 11 and the lower electrode 12.

Figure 18:
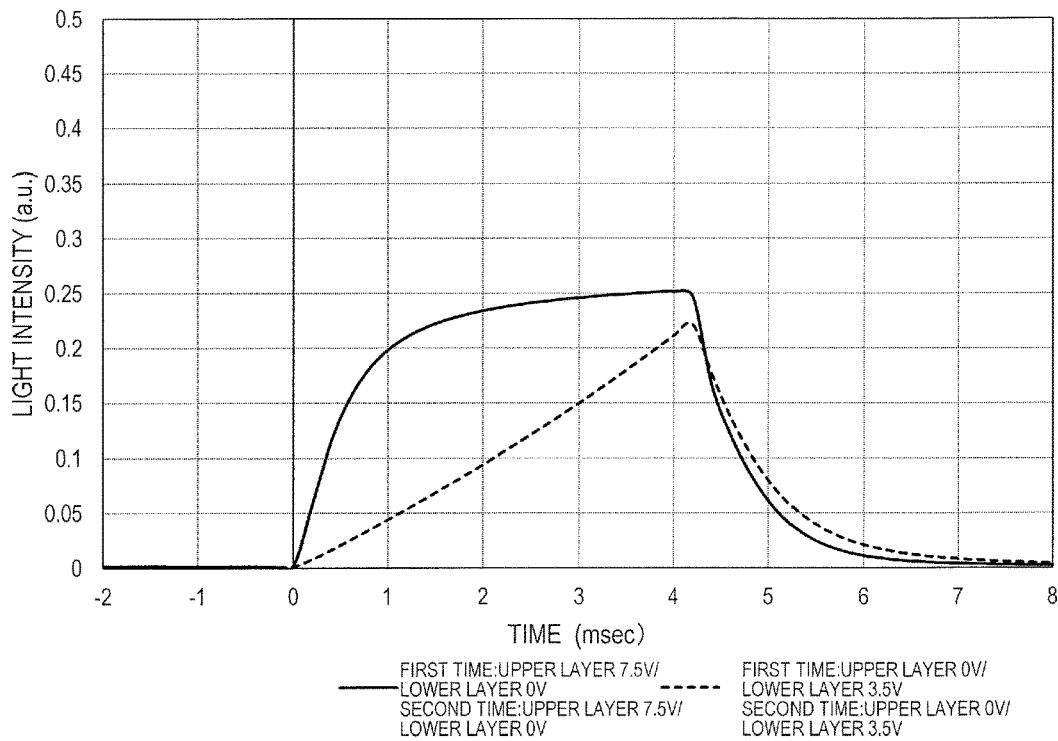
FIG. 18 A graph showing, in a construction where branch portions 11b have a width L of 5 μm and slits 11a have a width S of 3 μm, a response waveform in the case where an upper electrode 11, a lower electrode 12, and a counter electrode 21 respectively have potentials of 7.5 V, 0 V and 0 V, and a response waveform in the case where these respectively are 0 V, 3.5 V and 0 V, in each of a first-occurring write period and a second-occurring write period.

FIG. 18 shows, with respect to the same construction (i.e., a construction where L=5 μm, S=3 μm), response waveform in the case where an upper electrode 11, a lower electrode 12, and a counter electrode 21 respectively have potentials of 7.5 V, 0 V and 0 V, and a response waveform in the case where these respectively are 0 V, 3.5 V and 0 V, in each of a first-occurring write period and a second-occurring write period.

It can be seen from FIG. 18 that, when two writes are performed with the overdrive driving voltage V2, response characteristics are greatly improved over the case where two writes are performed with the normal driving voltage V1.

Moreover, in case (A), the second potential difference V2 may be given to the upper electrode 11 and the lower electrode 12 in a first-occurring write period in the second vertical scanning period (current vertical scanning period), and the first potential difference V1 may be given to the upper electrode 11 and the lower electrode 12 in a second-occurring write period. In other words, a first write may be performed with the overdrive driving voltage V2, and a second write may be performed with the normal driving voltage V1. As a result of this, response characteristics can be improved while suppressing abnormal changes in alignment.

Figure 19:
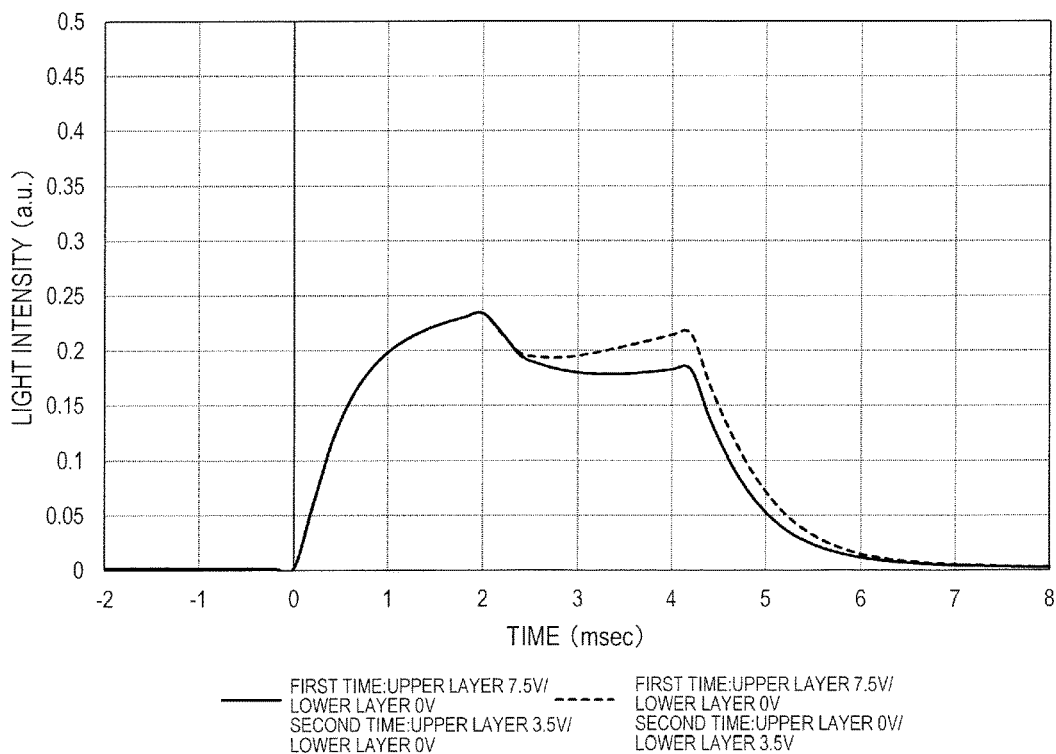
FIG. 19 A graph showing, in a construction where branch portions 11b have a width L of 5 μm and slits 11a have a width S of 3 μm, a response waveform in the case where an upper electrode 11, a lower electrode 12, and a counter electrode 21 respectively have potentials of 7.5 V, 0 V and 0 V in a first-occurring write period and 3.5 V, 0 V and 0 V in a second-occurring write period, and a response waveform in the case where these respectively are 7.5 V, 0 V and 0 V in first-occurring write period and 0 V, 3.5 V and 0 V in a second-occurring write period.

FIG. 19 shows, with respect to the same construction (i.e., a construction where L=5 μm, S=3 μm), a response waveform in the case where an upper electrode 11, a lower electrode 12, and a counter electrode 21 respectively have potentials of 7.5 V, 0 V and 0 V in a first-occurring write period and 3.5 V, 0 V and 0 V in a second-occurring write period, and a response waveform in the case where these respectively are 7.5 V, 0 V and 0 V in a first-occurring write period and 0 V, 3.5 V and 0 V in a second-occurring write period.

It can be seen from FIG. 19 that, in a second-occurring write period, it is brighter in the case where the lower electrode 12 has a potential of 3.5 V than in the case where the upper electrode 11 has a potential of 3.5 V. Therefore, even in the case where a first write is performed with the overdrive driving voltage V2 and a second write is performed with the normal driving voltage V1, it is more preferable in a second-occurring write period to apply the normal driving voltage V1, to the lower electrode 12 than apply the normal driving voltage V1 to the upper electrode 11.

Embodiment 2

Figure 20:
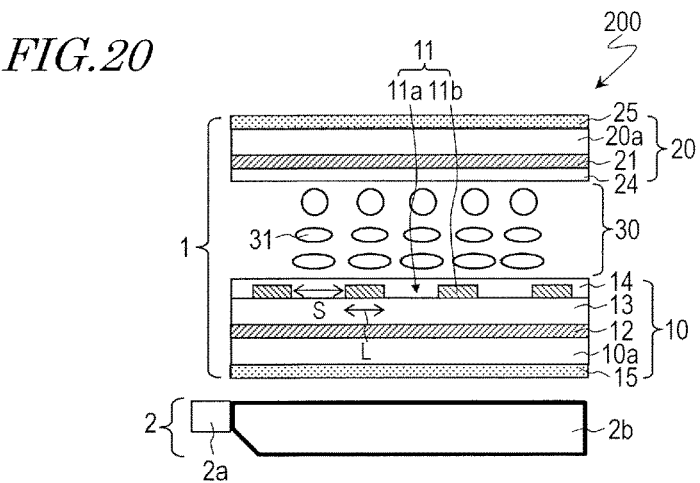
FIG. 20 A cross-sectional view schematically showing a liquid crystal display device 200 according to an embodiment of the present invention.
Figure 21:
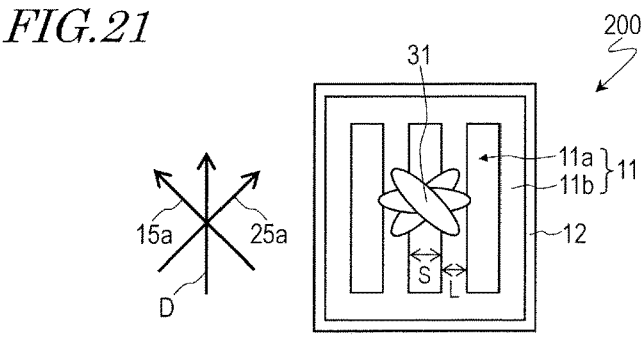
FIG. 21 A plan view schematically showing a liquid crystal display device 200 according to an embodiment of the present invention.

FIG. 20 and FIG. 21 show a liquid crystal display device 200 according to the present embodiment. FIG. 20 is a cross-sectional view schematically showing the liquid crystal display device 200, and FIG. 21 is a plan view schematically showing the liquid crystal display device 200. The following description will mainly concern differences of the liquid crystal display device 200 from the liquid crystal display device 100 of Embodiment 1.

As shown in FIG. 20 and FIG. 21, in the liquid crystal display device 200, the width L of the branch portions 11b is smaller than the width S of the slits 11a (i.e., L<S).

In the liquid crystal display device 200 of the present embodiment, too, the voltage to be applied across the liquid crystal layer 30 in the second vertical scanning period may be varied depending on whether it is case (when the first vertical scanning period and the second vertical scanning period are to display the same gray scale level and the pixel is to perform white displaying in the second vertical scanning period), or case (B) (when the first vertical scanning period and the second vertical scanning period are to display different gray scale levels and the pixel is to perform white displaying in the second vertical scanning period).

Specifically, the second vertical scanning period (current vertical scanning period) includes: in case (A), a write period in which a first potential difference (normal driving voltage) V1 which is 60% or less of the black displaying voltage V0 is to be given to the upper electrode and the lower electrode 12; and in case (B), a write period in which a second potential difference (overdrive driving voltage) V2 being greater than the first potential difference V1 is to be given to the upper electrode 11 and the lower electrode 12. Therefore, the liquid crystal display device 200 of the present embodiment excels in both stability of alignment and response characteristics.

Moreover, in the present embodiment, in a write period in which the first potential difference (normal driving voltage) V1 is given to the upper electrode 11 and the lower electrode 12, substantially the same potential as that of the counter electrode 21 is given to the lower electrode 12, while a different potential from that of the counter electrode 21 is given to the upper electrode 11. In other words, the normal driving voltage V1 is applied to the upper electrode 11. In a write period in which the second potential difference (overdrive driving voltage) V2 is given to the upper electrode 11 and the lower electrode 12, substantially the same potential as that of the counter electrode 21 is given to the lower electrode 12, while a different potential from that of the counter electrode is given to the upper electrode 11. In other words, the ovrdrive driving voltage V2 is applied to the upper electrode 11.

Thus, in a construction where the width L of the branch portions 11b is smaller than the width S of the slits 11a, by applying the normal driving voltage V1 to the upper electrode 11 in making a write with the normal driving voltage V1 and applying the overdrive driving voltage V2 to the upper electrode 11 in making a write with the overdrive driving voltage V2, further improvements in response characteristics and/or brightness can be achieved.

Figure 22:
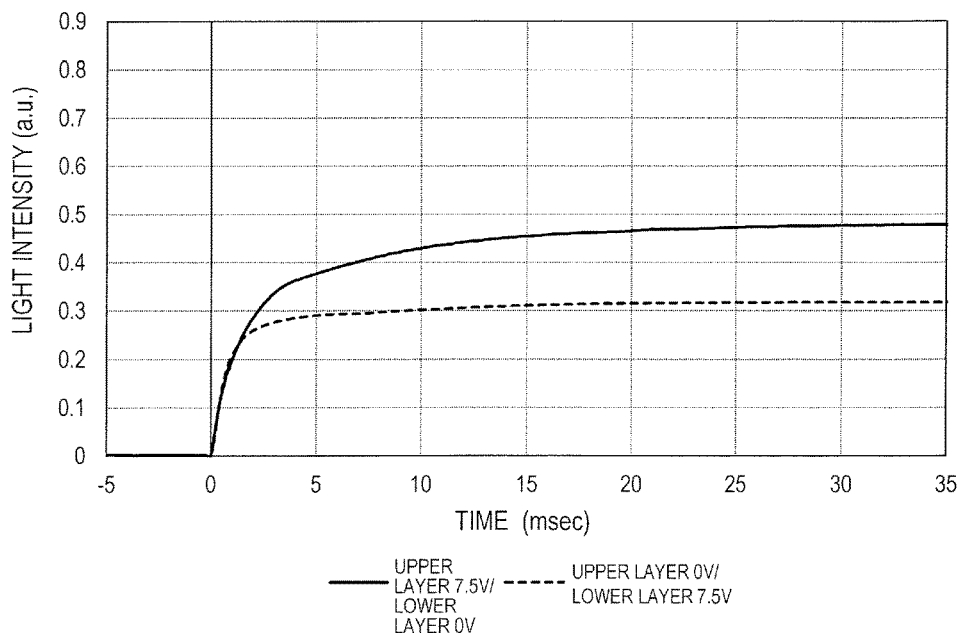
FIG. 22 A graph showing, in a construction where branch portions 11b have a width L of 3 μm and slits 11a have a width S of 7 μm, a response waveform in the case where an upper electrode 11, a lower electrode 12, and a counter electrode 21 respectively have potentials of 7.5 V, 0 V and 0 V, and a response waveform in the case where these respectively are 0 V, 7.5 V and 0 V.
Figure 23:
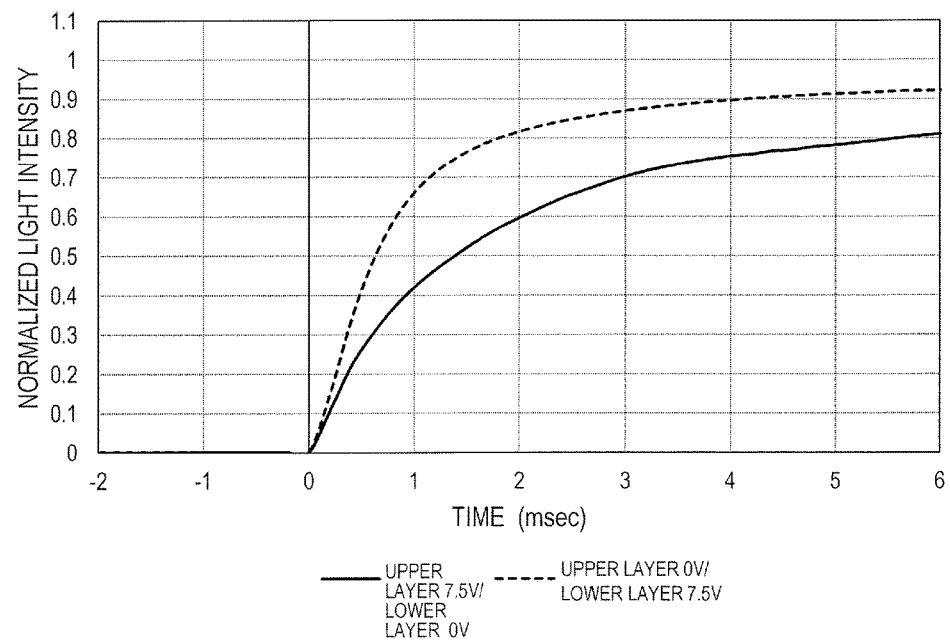
FIG. 23 A graph showing, in a construction where branch portions 11b have a width L of 3 μm and slits 11a have a width S of 7 μm, a response waveform in the case where an upper electrode 11, a lower electrode 12, and a counter electrode 21 respectively have potentials of 7.5 V, 0 V and 0 V, and a response waveform in the case where these respectively are 0 V, 7.5 V and 0 V.

FIG. 22 and FIG. 23 show a response waveform in the case where an upper electrode 11, a lower electrode 12, and a counter electrode 21 respectively have potentials of 7.5 V, 0 V and 0 V, and a response waveform in the case where these respectively are 0 V, 7.5 V and 0 V, in a construction where the branch portions 11b have a width L of 3 μm and the slits 11a have a width S of 7 μm (i.e., a construction where L<S). In FIG. 22, light intensity (a.u.) is taken on the vertical axis, whereas in FIG. 23, relative light intensity (i.e., light intensity which is normalized by the finally-reached light intensity in each case) is taken on the vertical axis (in either case, time (msec) is taken on the horizontal axis).

As can be seen from FIG. 22, the final light intensity is higher in the case where the upper electrode 11 has a potential of 7.5 V, and, in a comparatively short period after voltage application (up to 2.1 msec), light intensity increases in essentially similar manners in the case where the upper electrode 11 has a potential of 7.5 V and in the case where lower electrode 12 has a potential of 7.5 V. Therefore, it is more preferable to apply the overdrive diving voltage V2 to the upper electrode 11 than apply the overdrive driving voltage V2 to the lower electrode 12. Although the response speed may appear faster in the case where lower electrode 12 has a potential of 7.5 V in FIG. 23, this appearance is simply because the final light intensity is higher in the case where the upper electrode 11 has a potential of 7.5 V.

Figure 24:
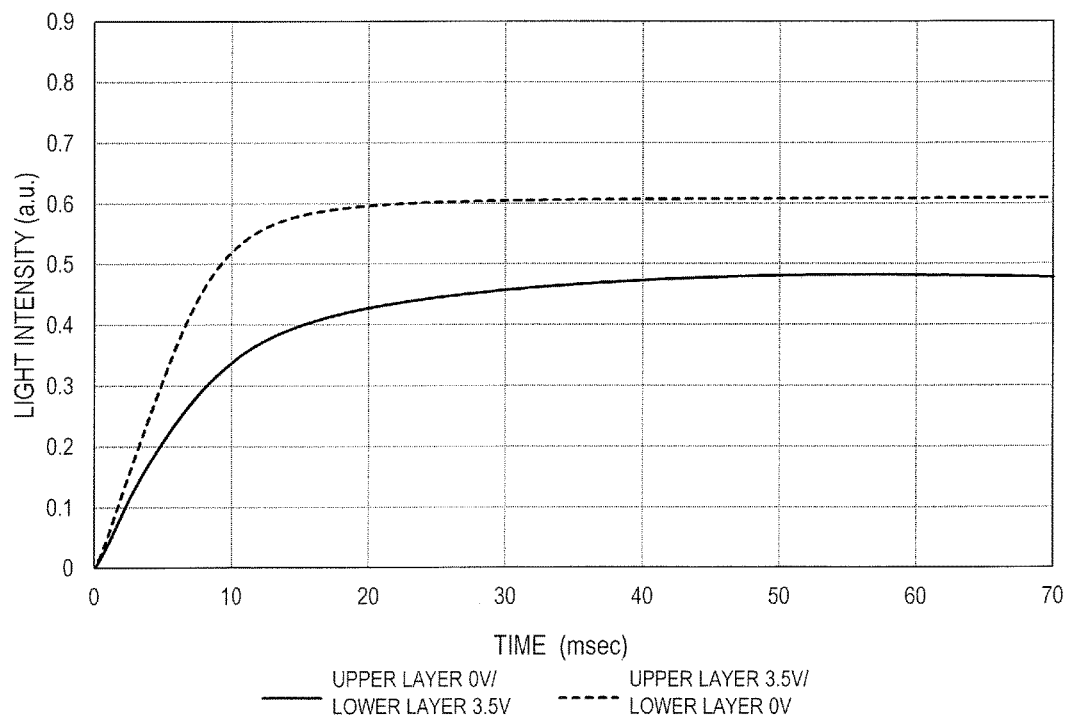
FIG. 24 A graph showing in a construction where branch portions 11b have a width L of 3 μm and slits 11a have a width S of 7 μm, a response waveform in the case where an upper electrode 11, a lower electrode 12, and a counter electrode 21 respectively have potentials of 3.5 V, 0 V and 0 V and a response waveform in the case where these respectively are 0 V, 3.5 V and 0 V.

FIG. 24 shows, with respect to the same construction (i.e., a construction where L=3 μm, S=7 μm), a response waveform in the case where an upper electrode 11, a lower electrode 12, and a counter electrode 21 respectively have potentials of 3.5 V, 0 V and 0 V, and a response waveform in the case where these respectively are 0 V, 3.5 V and 0 V.

As can be seen from FIG. 24 the final light intensity is higher (i.e., brighter) in the case where the upper electrode 11 has a potential of 3.5 V than in the case where the lower electrode 12 has a potential of 3.5 V. Therefore, it is more preferable to apply the normal driving voltage V1 to the upper electrode 11 than apply the normal driving voltage V1 to the lower electrode 12.

In the liquid crystal display device 200 of the present embodiment, too, in order to reduce the influence of step response, it is preferable that one vertical scanning period includes two write periods (i.e., two writes are performed). For example, writes may be performed with the same voltage setting in a first-occurring write period and a second-occurring write period.

Specifically, in case (A), in each of a first-occurring write period and a second-occurring write period in the second vertical scanning period (current vertical scanning period), the first potential difference (normal driving voltage) V1 may be given to the upper electrode 11 and the lower electrode 12.

In case (B), in each of a first-occurring write period and a second-occurring write period in the second vertical scanning period (current vertical scanning period), the second potential difference (overdrive driving voltage) V1 may be given to the upper electrode 11 and the lower electrode 12.

Figure 25:
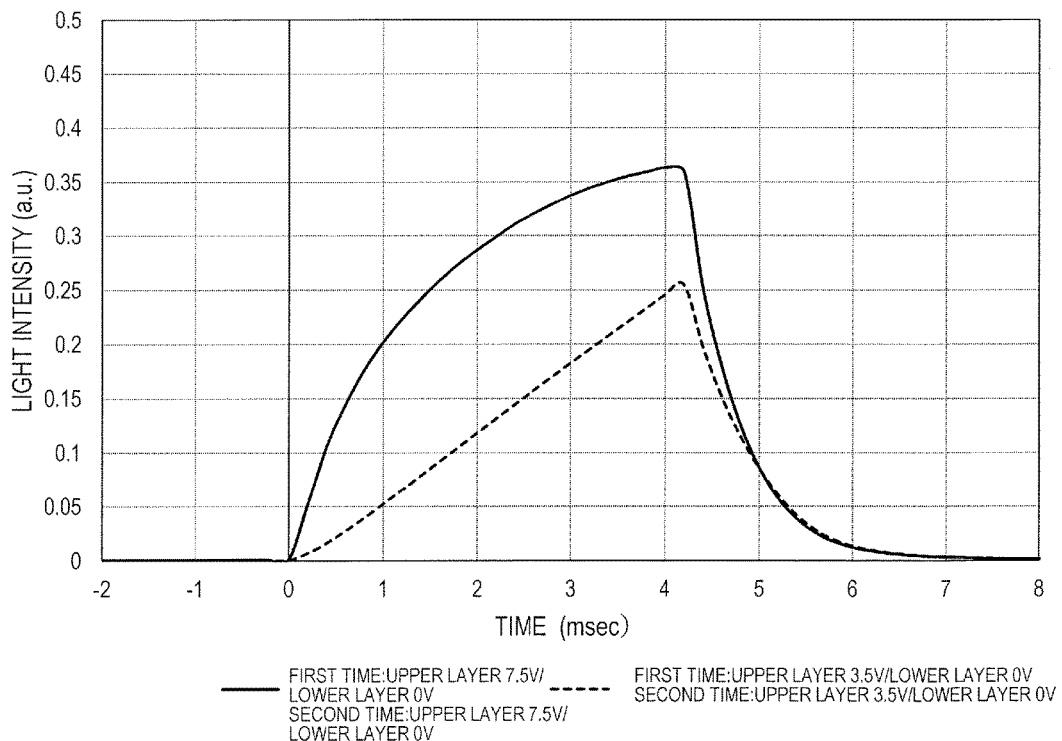
FIG. 25 A graph showing, a construction where branch portions 11b have a width L of 3 µm and slits 11a have a width S of 7 µm, a response waveform in the case where an upper electrode 11, a lower electrode 12, and a counter electrode 21 respectively have potentials of 7.5 V, 0 V and 0 V, and a response waveform in the case where these respectively are 3.5 V, 0 V and 0 V, in each of a first-occurring write period and a second-occurring write period.

FIG. 25 shows, with respect to the same construction (i.e., a construction where L=3 μm, S=7 μm), a response waveform in the case where an upper electrode 11, a lower electrode 12, and a counter electrode 21 respectively have potentials of 7.5 V, 0 V and 0 V, and a response waveform in the case where these respectively are 3.5 V, 0 V and 0 V, in each of a first-occurring write period and a second-occurring write period.

It can be seen from FIG. 25 that, when two writes are performed with the overdrive driving voltage V1, response characteristics are greatly improved over the case where two writes are performed with the normal driving voltage V1.

Moreover, in case (A), the second potential difference V2 may be given to the upper electrode 11 and the lower electrode 12 in a first-occurring write period in the second vertical scanning period (current vertical scanning period), and the first potential difference V1 may be given to the upper electrode 11 and the lower electrode 12 in a second-occurring write period. In other words, a first write may be performed with the overdrive driving voltage V2, and a second write may be performed with the normal driving voltage V1. A response characteristics can be improved while suppressing abnormal changes in alignment.

Figure 26:
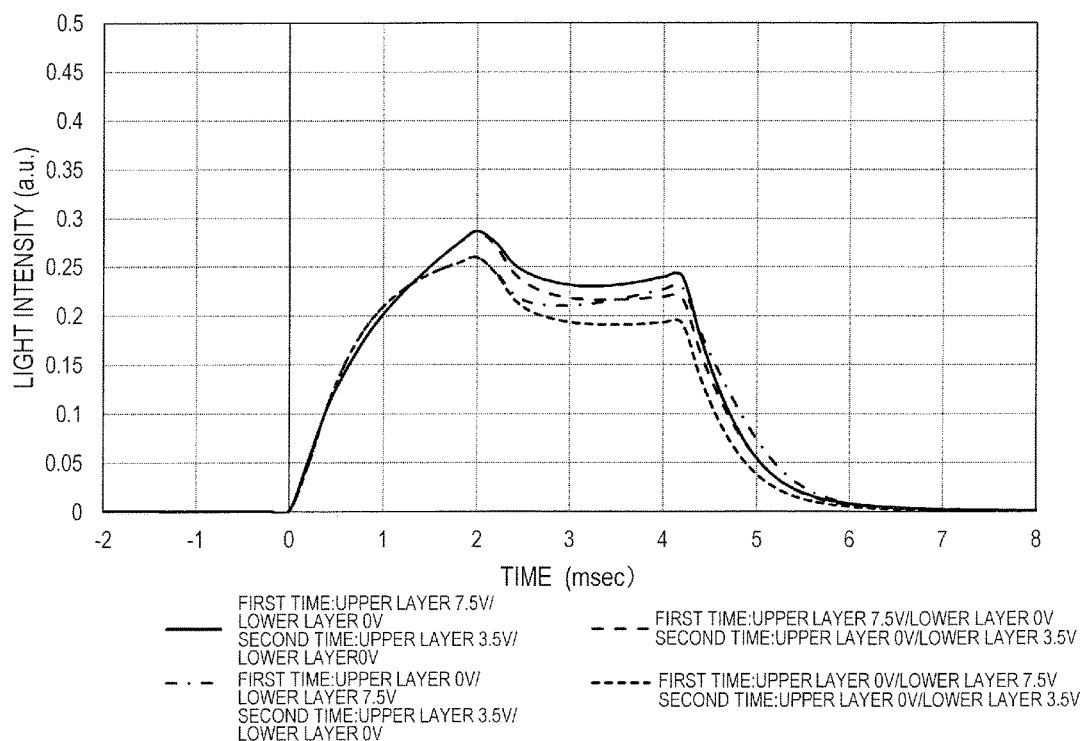
FIG. 26 A graph showing, a construction where branch portions 11b have a width L of 3 µm and slits 11a have a width S of 7 µm, a response waveform in the case where an upper electrode 11, a lower electrode 12, and a counter electrode 21 respectively have potentials of 7.5 V, 0 V and 0 V in a first-occurring write period and 3.5 V, 0 V and 0 V in a second-occurring write period, a response waveform in the case where these respectively are 7.5 V, 0 V and 0 V in a first-occurring write period and 0 V, 3.5 V and 0 V in a second-occurring write period, a response waveform in the case where these respectively are 0 V, 7.5 V and 0 V in a first-occurring write period and 3.5 V, 0 V and 0 V in a second-occurring write period, a response waveform in the case where these respectively are 0 V, 7.5 V and 0 V in a first-occurring write period and 0 V, 3.5 V and 0 V in a second-occurring write period.

FIG. 26 shows, with respect to the same construction (i.e., a construction where L=3 μm, S=7 μm), a response waveform in the case where an upper electrode 11, a lower electrode 12, and a counter electrode 21 respectively have potentials of 7.5 V, 0 V and 0 V in a first-occurring write period and 3.5 V, 0 V and 0 V in a second-occurring write period, and a response waveform in the case where these respectively are 7.5 V, 0 V and 0 V in a first-occurring write period and 0 V, 3.5 V and 0 V in a second-occurring write period. FIG. 26 also shows a response waveform in the case where an upper electrode 11, a lower electrode 12, and a counter electrode 21 respectively have potentials of 0 V, 7.5 V and 0 V in a first-occurring write period and 3.5 V, 0 V and 0 V in a second-occurring write period, and a response waveform in the case where these respectively are 0 V, 7.5 V and 0 V in a first-occurring write period and 0 V, 3.5 V and 0 V in a second-occurring write period.

It can be seen from FIG. 26 that, in a second-occurring write period, it is brighter in the case where the upper electrode 11 has a potential of 3.5 V than in the case where the lower electrode 12 has a potential 3.5 V. Therefore, even in the case where a first write is performed with the overdrive driving voltage V2 and a second write is performed with the normal driving voltage V1, it is more preferable in a second-occurring write period to apply the normal driving voltage V1 to the upper electrode 11 than apply the normal driving voltage V1 to the lower electrode 12. It can be also be seen from FIG. 26 that, in a first-occurring write period, it is brighter in the case where the upper electrode 11 has a potential of 7.5 V than in the case where lower electrode 12 has a potential of 7.5 V. Therefore, in a first-occurring write period, it is more preferable to apply the overdrive driving voltage V2 to the upper electrode 11 than apply the overdrive driving voltage V2 to the lower electrode 12.

Embodiment 3

Figure 27:
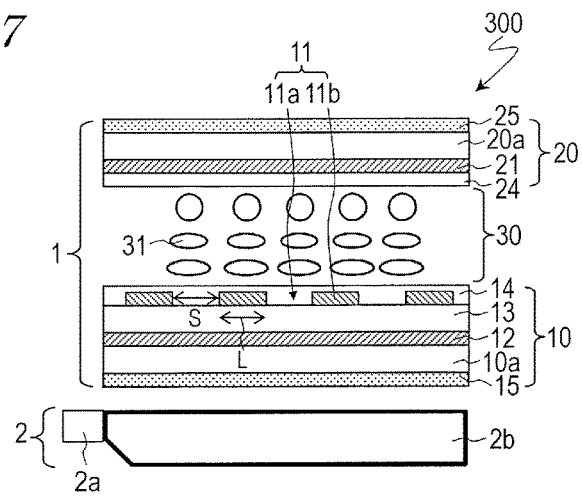
FIG. 27 A cross-sectional view schematically showing a liquid crystal display device 300 according to an embodiment of the present invention.
Figure 28:
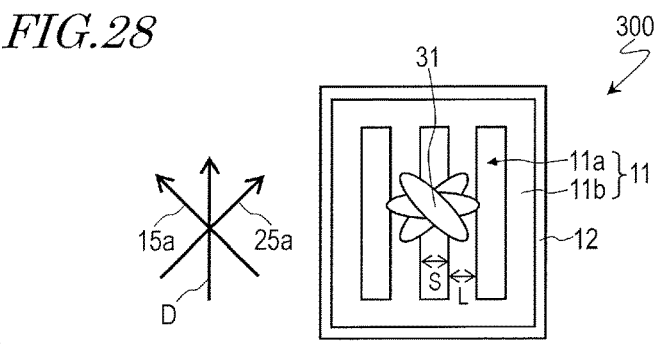
FIG. 28 A plan view schematically showing a liquid crystal display device 300 according to an embodiment of the present invention.

FIG. 27 and FIG. 28 show a liquid crystal display device 300 according to the present embodiment. FIG. 27 is a cross-sectional schematically showing the liquid crystal display device 300, and FIG. 28 is a plan view schematically showing the liquid crystal display device 300. The following description will mainly concern differences of the liquid crystal display device 300 from the liquid crystal display device 100 of Embodiment 1.

As shown in FIG. 27 and FIG. 28, in the liquid crystal display device 300, the width L of the branch portions 11b and the width S of the slits 11a are equal (i.e., L=S).

In the liquid crystal display device 300 of the present embodiment, too, the voltage to be applied across the liquid crystal layer 30 in the second vertical scanning period may be varied depending on whether it is case (A) (when the first vertical scanning period and the second vertical scanning period are to display the same gray scale level and the pixel is to perform white displaying in the second vertical scanning period), or case (B) (when the first vertical scanning period and the second vertical scanning period are to display different gray scale levels and the pixel is to perform white displaying in the second vertical scanning period).

Specifically, the second vertical scanning period (current vertical scanning period) includes: in case (A), a write period in which a first potential difference (normal driving voltage) V1 which is 60% or less of the black displaying voltage V0 is to be given to the upper electrode 11 and the lower electrode 12; and in case (B), a write period in which a second potential difference (overdrive driving voltage) V2 being greater than the first potential difference V1 is to be given to the upper electrode 11 and the lower electrode 12. Therefore, the liquid crystal display device 300 of the present embodiment excels in both stability of alignment and response characteristics.

Moreover, in the present embodiment, in a write period in which the first potential difference (normal driving voltage.) V1 is given to the upper electrode 11 and the lower electrode 12, substantially the same potential as that of the counter electrode 21 is given to the upper electrode 11, while a different potential from that of the counter electrode 21 is given to the lower electrode 12. In other words, the normal driving voltage V1 is applied to the lower electrode 12. In a write period in which the second potential difference (overdrive driving voltage) V2 is given to the upper electrode 11 and the lower electrode 12, substantially the same potential as that of the counter electrode 21 is given to the lower electrode 12, while a different potential from that of the counter electrode 21 is given to the upper electrode 11. In other words, the overdrive driving voltage V2 is applied to the upper electrode 11.

Thus, in a construction where the width L of the branch portions 11b and the width S of the slits 11a are equal, by applying the normal driving voltage V1 to the lower electrode 12 in making a write with the normal driving voltage V1 and applying the overdrive driving voltage V2 to the upper electrode 11 in making a write with the overdrive driving voltage V2, further improvements in response characteristics and brightness can be achieved.

Figure 29:
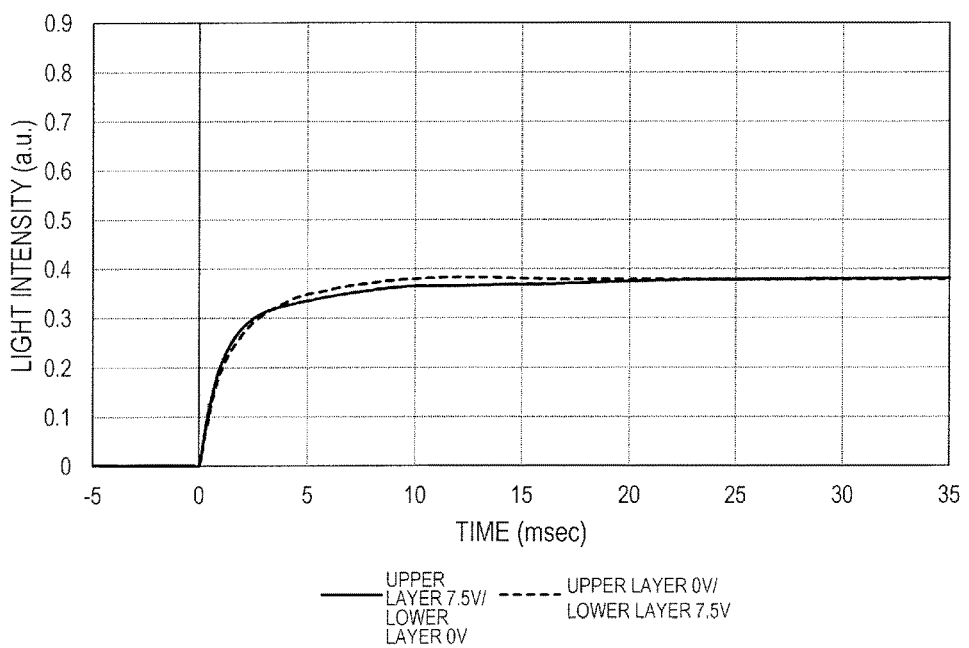
FIG. 29 A graph showing, in a construction where branch portions 11b have a width L of 6 µm and slits 11a have a width S of 6 µm, a response waveform in the case where an upper electrode 11, a lower electrode 12, and a counter electrode 21 respectively have potentials of 7.5 V, 0 V and 0 V, and a response waveform in the case where these respectively are 0 V, 7.5 V and 0 V.
Figure 30:
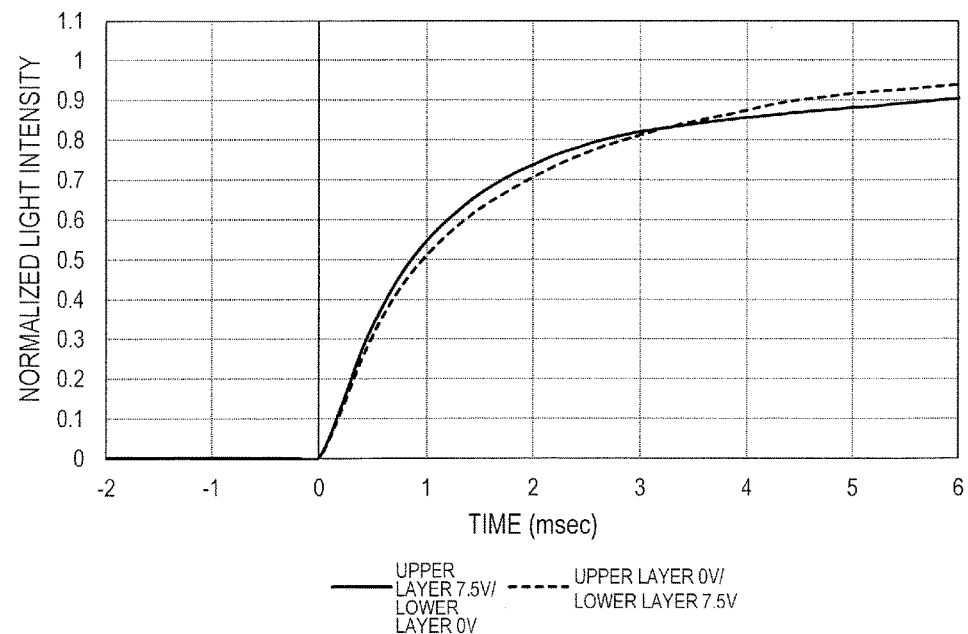
FIG. 30 A graph showing in a construction where branch portions 11b have a width L of 6 µm and slits 11a have a width S of 6 µm, a response waveform in the case where an upper electrode 11, a lower electrode 12, and a counter electrode 21 respectively have potentials of 7.5 V, 0 V and 0 V, and a response waveform in the case where these respectively are 0 V, 7.5 V and 0 V.

FIG. 29 and FIG. 30 show a response waveform in the case where an upper electrode 11, a lower electrode 12, and a counter electrode 21 respectively have potentials of 7.5 V, 0 V and 0 V, and a response waveform in the case where these respectively are 0 V, 7.5 V and 0 V, in a construction where the width L of the branch portions 11b is 6 µm and the width S of the slits 11a is 6 µm (i.e., a construction where L=S). In FIG. 29, light intensity (a.u.) is taken on the vertical axis, whereas in FIG. 30, relative light intensity (i.e., light intensity which is normalized by the finally-reached light intensity in each case) is taken on the vertical axis (in either case, time (msec) is taken on the horizontal axis).

As can be seen from FIG. 29 and FIG. 30, there is not much difference in the final light intensity between the case where the upper electrode 11 has a potential of 7.5 V and the case where lower electrode 12 has a potential of 7.5 V, but the response speed during a comparatively short period after voltage application is slightly faster in the case where the upper electrode 11 has a potential of 7.5 V. This is because, while the voltage to be applied across the liquid crystal layer 30 is divided by the insulating layer 13 on the lower electrode 12 in the case where lower electrode 12 has a potential of 7.5 V, no such division occurs in the case where the upper electrode 11 has a potential of 7.5 V. Therefore, it is more preferable to apply the overdrive driving voltage V2 to the upper electrode 11 than apply the overdrive driving voltage V2 to the lower electrode 12.

Figure 31:
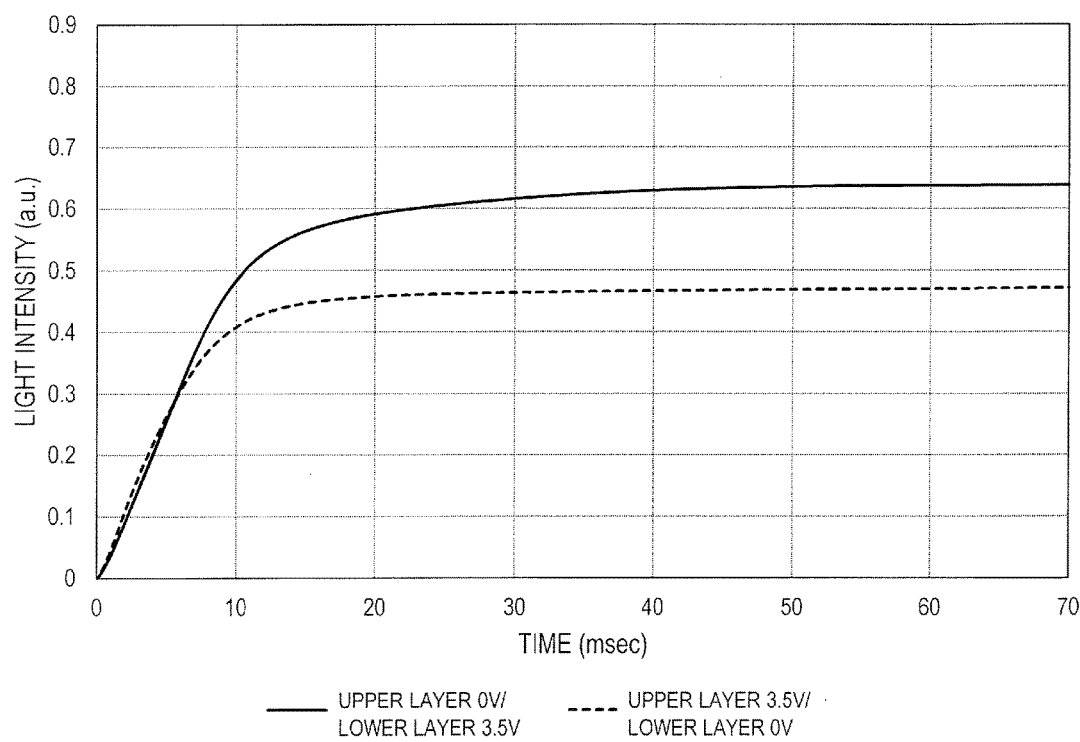
FIG. 31 A graph showing, a construction where branch portions 11b have a width L of 6 µm and slits 11a have a width S of 6 µm, a response waveform in the case where an upper, electrode 11, a lower electrode 12, and a counter electrode 21 respectively have potentials of 3.5 V, 0 V and 0 V, and a response waveform in the case where these respectively are 0 V, 3.5 V and 0 V.

FIG. 31 shows, with respect to the same construction (i.e., a construction where L=6 µm, S=6 µm), a response waveform in the case where an upper electrode 11, a lower electrode 12, and a counter electrode 21 respectively have potentials of 3.5 V, 0 V and 0 V, and a response waveform in the case where these respectively are 0 V, 3.5 V and 0 V.

As can be seen from FIG. 31, the final light intensity is higher (i.e., brighter) in the case where the lower electrode 12 has a potential of 3.5 V than in the case where the upper electrode 11 has a potential of 3.5 V. This is presumably because, in the case where the lower electrode 12 has a potential of 3.5 V, the voltage to be applied across the liquid crystal layer 30 is divided by the insulating layer 13 on the lower electrode 12, whereby a vertical field component that in inevitably generated in the liquid crystal layer 30 is weakened, thus resulting in more brightness. Therefore, it is more preferable no apply the normal driving voltage V1 to the lower electrode 12 than apply the normal driving voltage V1 to the upper electrode 11.

In the liquid crystal display device 300 of the present embodiment, too, in order to reduce the influence of step response, it is preferable that one vertical scanning period includes two write periods (i.e., two writes are performed). For example, writes may be performed with the same voltage setting in a first-occurring write period and a second-occurring write period.

Specifically, in case (A), in each of a first-occurring write period and a second occurring write period in the second vertical scanning period (current vertical scanning period), the first potential difference (normal driving voltage) V1 may be given to the upper electrode 11 and the lower electrode 12.

In case (B), in each of a first-occurring write period and a second-occurring write period in the second vertical scanning period (current vertical scanning period), the second potential difference (overdrive driving voltage) V2 may be given to the upper electrode 11 and the lower electrode 12.

Figure 32:
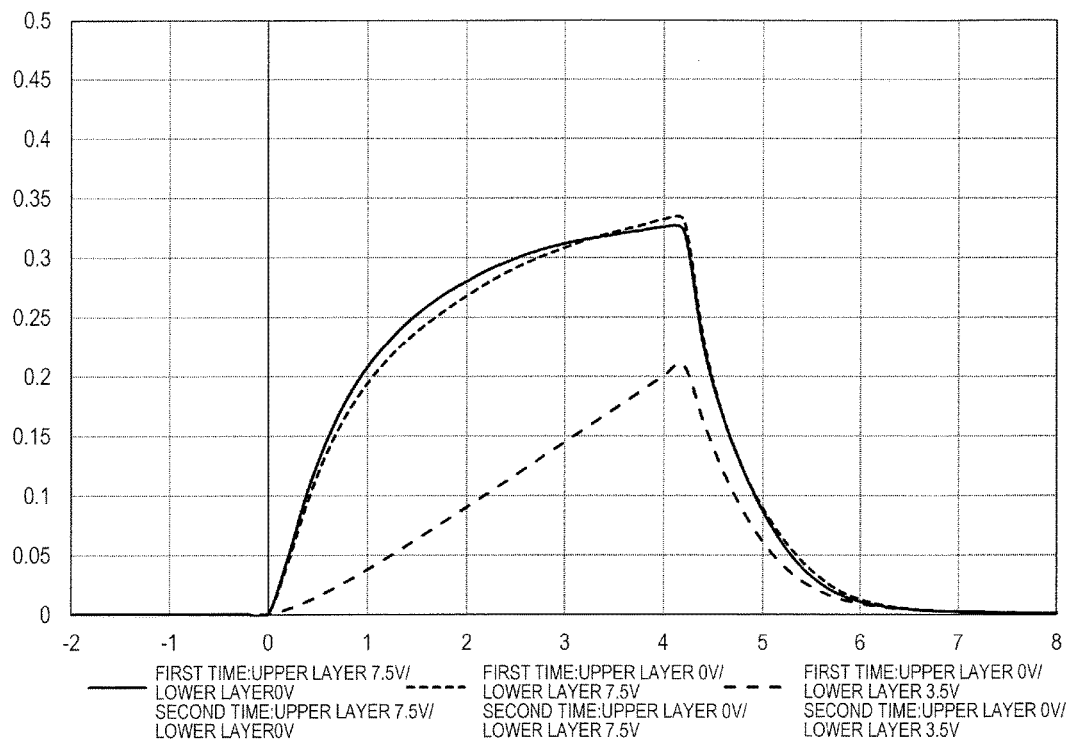
FIG. 32 A graph showing, in a construction where branch portions 11b have a width L of 6 µm and slits 11a have a width S of 6 µm, a response waveform in the case where an upper electrode 11, a lower electrode 12, and a counter electrode 21 respectively have potentials of 7.5 V, 0 V and 0 V, a response waveform in the case where these respectively are 0 V, 7.5 V and 0 V, and a response waveform in the case where these respectively are 0 V, 3.5 V and 0 V, in each of a first-occurring write period and a second-occurring write period.

FIG. 32 shows, with respect to the same construction (i.e., a construction where L=6 µm, S=6 µm), a response waveform in the case where an upper electrode 11, a lower electrode 12, and a counter electrode 21 respectively have potentials of 7.5 V, 0 V and 0 V, a response waveform in the case where these respectively are 0 V, 7.5 V and 0 V, and a response waveform in the case, where these respectively are 0 V, 3.5 V and 0 V, in each of a first-occurring write period and a second-occurring write period.

It can be seen from FIG. 32 that, when two writes are performed with the overdrive driving voltage V2, response characteristics are greatly improved over the case where two writes are performed with the normal driving voltage V1. It can also be seen that it is more preferable to apply the overdrive driving voltage V2 to the upper electrode 11 than apply the overdrive driving voltage V2 to the lower electrode 12.

Moreover, in case (A), the second potential difference V2 may be given to the upper electrode 11 and the lower electrode 12 in a first-occurring write period in the second vertical scanning period (current vertical scanning period), and the first potential difference V1 may be given to the upper electrode 11 and the lower electrode 12 in a second-occurring write period. In other words, a first write may be performed with the overdrive driving voltage V2, and a second write may be performed with the normal driving voltage V1. As a result of this, response characteristics can be improved while suppressing abnormal changes in alignment.

Figure 33:
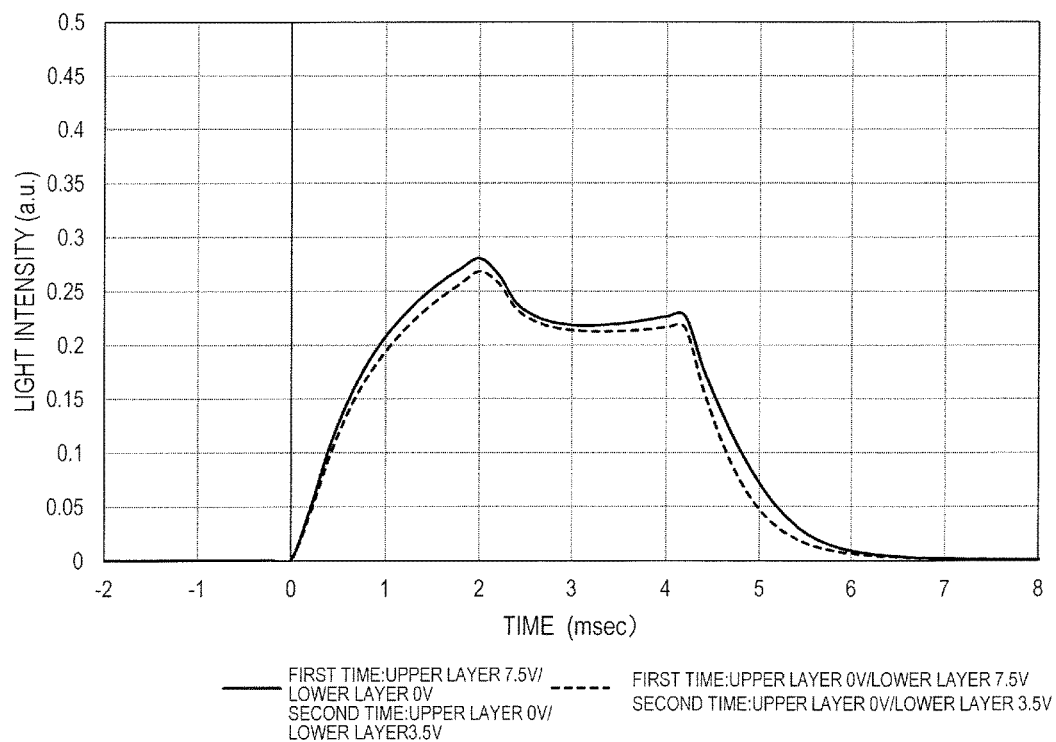
FIG. 33 A graph showing, in a construction where branch portions 11b have a width L of 6 µm and slits 11a have a width S of 6 µm, a response waveform in the case where an upper electrode 11, a lower electrode 12, and a counter electrode 21 respectively have potentials of 7.5 V, 0 V and 0 V in a first-occurring write period and 0 V, 3.5 V and 0 V in a second-occurring write period, and a response waveform in the case where these respectively are 0 V, 7.5 V and 0 V in a first-occurring write period and 0 V, 3.5 V and 0 V in a second-occurring write period.

FIG. 33 shows, with respect to the same construction (i.e., a construction where L=6 μm, S=6 μm), a response waveform in the case where an upper electrode 11, a lower electrode 12, and a counter electrode 21 respectively have potentials of 7.5 V, 0 V and 0 V in a first-occurring write period and 0 V, 3.5 V and 0 V in a second occurring write period, and a response waveform in the case where these respectively are 0 V, 7.5 V and 0 V in a first-occurring write period and 0 V, 3.5 V and 0 V in a second-occurring write period.

It can be seen from FIG. 33 that, in a first-occurring write period, it is slightly brighter in the case where the upper electrode 11 has a potential of 7.5 V than in the case where lower electrode 12 has a potential of 7.5 V. Therefore, even in the case where a first write is performed with the overdrive driving voltage V1 and a second write is performed with the normal driving voltage V1, it is more preferable in a first-occurring write period to apply the overdrive driving voltage V2 to the upper electrode 11 than apply the overdrive driving voltage V2 to the lower electrode 12.

As described above, the liquid crystal display devices 100, 200 and 300 according to embodiments of the present invention excel in both stability of alignment and response characteristics.

In order to determine whether the gray scale level to be displayed is the same or different between the first vertical scanning period (previous vertical scanning period) and the second vertical scanning period (current vertical scanning period), the crystal display devices 100, 200 and 300 may include, for example, a frame memory which retains an image signal corresponding to one vertical scanning period, and an arithmetic circuit which compares an image signal of the current vertical scanning period against the image signal from the previous vertical scanning period as retained in the frame memory. Thus, it is only necessary to compare between the gray scale level to be displayed in the previous vertical scanning period and the gray scale level to be displayed in the current vertical scanning period, and therefore switching between normal driving and overdrive driving can be realized with a comparatively small scale of circuitry.

The specific levels (values) of the normal driving voltage V1 and the overdrive driving voltage V2 are not limited to those exemplified in FIG. 15 to FIG. 19, FIG. 22 to FIG. 26, and FIG. 29 to FIG. 33. Preferable values of the normal driving voltage V1 and the overdrive driving voltage V2 may vary depending on the specifications of the liquid crystal display panel 1. Although the above description illustrates a case where the counter electrode 21 has a potential of 0 V, it will be appreciated that the potential of the counter electrode 21 may not be 0 V.

In the case where the pixel performs intermediate level displaying in the second vertical scanning period (current vertical scanning period), too, as in the case of performing white displaying, two driving voltages may be separately used.

Specifically, the voltage to be applied across the liquid crystal layer 30 in the second vertical scanning period may be varied depending on whether it is (hereinafter referred to as "case (C)") when the first vertical scanning period and the second vertical scanning period are to display the same gray scale level and the pixel is to display a certain intermediate level in the second vertical scanning period, or (hereinafter referred to as "case (D)") when the first vertical scanning period and the second vertical scanning period are to display different gray scale levels and the pixel is to display the aforementioned certain intermediate level in the second vertical scanning period.

Specifically, in case (C), the second vertical scanning period may include a write period in which a third potential difference V3 which is 60% or less of a potential difference V0 between the lower electrode 11 and the counter electrode 21 in the black displaying state is to be given to the upper electrode 11 and the lower electrode 12. In case (D), the second vertical scanning period may include a write period in which a fourth potential difference V4 being greater than the third potential difference V3 (i.e., more than 60% of the potential difference V0) is to be given to the upper electrode 11 and the lower electrode 12. Herein, the third potential difference V3 smaller than the first potential difference V1. The fourth potential difference V4 is equal to or greater than the second potential difference V2.

In a construction where the width L of the branch portions 11b is equal to or greater than the width S of the slits 11a (i.e., L≥S), in a write period in which the third potential difference V3 is to be given to the upper electrode 11 and the lower electrode 12, preferably a potential with a greater absolute value is applied to the lower electrode 12 than to the upper electrode 11, based on the potential of the counter electrode 21 as a reference, and in a write period in which the fourth potential difference V4 is to be given to the upper electrode 11 and the lower electrode 12, preferably a potential with a greater absolute value is applied to the upper electrode 11 than to the lower electrode 12, based on the potential of the counter electrode 21 as a reference. As a result, further improvements in response characteristics and/or brightness can be achieved.

On the other hand, in a construction where the width L of the branch portions 11b is smaller than the width S of the slits 11a (i.e., L<S), in a write period in which the third potential difference V3 is to be given to the upper electrode 11 and the lower electrode 12, preferably a potential with a greater absolute value is applied to the upper electrode 11 than to the lower electrode 12, based on the potential of the counter electrode 21 as a reference, and in a write period in which the fourth potential difference V4 is to be given to the upper electrode 11 and the lower electrode 12, preferably a potential with a greater absolute value is applied to the upper electrode 11 than to the lower electrode 12, based on the potential of the counter electrode 21 as a reference. As a result, further improvements in response characteristics and/or brightness can be achieved.

In the above-described embodiments, liquid crystal molecules 31 in the liquid crystal layer 30 take a twist alignment in the transparent displaying state. This allows a more vivid (clearer) transparent displaying to be realized. Under a twist alignment, the liquid crystal molecules 31 are oriented in an identical direction within a plane which is parallel to the display surface; therefore, any diffraction associated with refractive index differences within the plane, or any diffraction associated with dark lines ascribable to the liquid crystal mode (i.e., dark lines caused by structures for regulating the alignment direction, or points of discontinues alignment directions that may occur within the plane) does not occur.

The example illustrated herein is a construction where liquid crystal molecules 31 near the center along the thickness direction of the liquid crystal layer 30 are aligned substantially orthogonal to the slit direction D (that is, an average orientation direction in the bulk liquid crystal is substantially orthogonal to the slit direction D) in the white displaying state and in the transparent displaying state. Alternatively, a construction where liquid crystal molecules 31 near the center along the thickness direction of the liquid crystal layer 30 are aligned substantially parallel to the slit direction D (that is, an average orientation direction in the bulk liquid crystal is substantially parallel to the slit direction D) in the white displaying state and in the transparent displaying state may be adopted. However, from the standpoint of brightness of display, the former construction (which hereinafter may also be referred to as the "orthogonal type") is more preferable than the latter construction (which hereinafter may also be referred to as the "parallel type").

Moreover, as in a liquid crystal display device 100' shown in FIG. 34 and FIG. 35, a construction may be adopted where liquid crystal molecules 31 in the liquid crystal layer 30 take a homogeneous alignment in a transparent displaying state.

In the liquid crystal display device 100', the pretilt direction defined by each of the first horizontal alignment film 14 and the second horizontal alignment film 24 is set so that the liquid crystal molecules 31 will take a homogeneous alignment in a state where no voltage is applied to the liquid crystal layer 30 (i.e., a state where no electric field is generated). Specifically, the pretilt direction defined by each of the first horizontal alignment film 14 and the second horizontal alignment film 24 is substantially orthogonal to the direction that the slits 11a in the upper electrode 11 extend (slit direction) D. In other words, the pretilt direction defined by the first horizontal alignment film 14 and the pretilt direction defined by the second horizontal alignment film 24 are parallel or antiparallel to each other.

Moreover, the respective transmission axes 15a and 25a the first polarizing plate 15 and the second polarizing plate 25 constitute an angle of about 45° with the pretilt direction that is defined by each of the first horizontal alignment film 14 and the second horizontal alignment film 24. Therefore, the respective transmission axes 15a and 25a of the first polarizing plate 15 and the second polarizing plate 25 constitute an angle of about 45° with the slit direction D.

FIGS. 36(a) and (b) show an alignment of liquid crystal molecules 31 in a black displaying state. In the black displaying state, a predetermined voltage is applied between the counter electrode 21 and the upper electrode 11 and lower electrode 12, whereby a vertical field is generated across the liquid crystal layer 30. FIG. 36(a) schematically shows the electric lines of force in this state with broken lines.

In this black displaying state, as shown in FIGS. 36(a) and (b), the liquid crystal molecules 31 in the liquid crystal layer 30 are aligned substantially vertically to the substrate plane (the surfaces of the rear substrate 10 and the front substrate 20) (i.e., substantially parallel to the layer normal direction of the liquid crystal layer 30).

Figure 37:
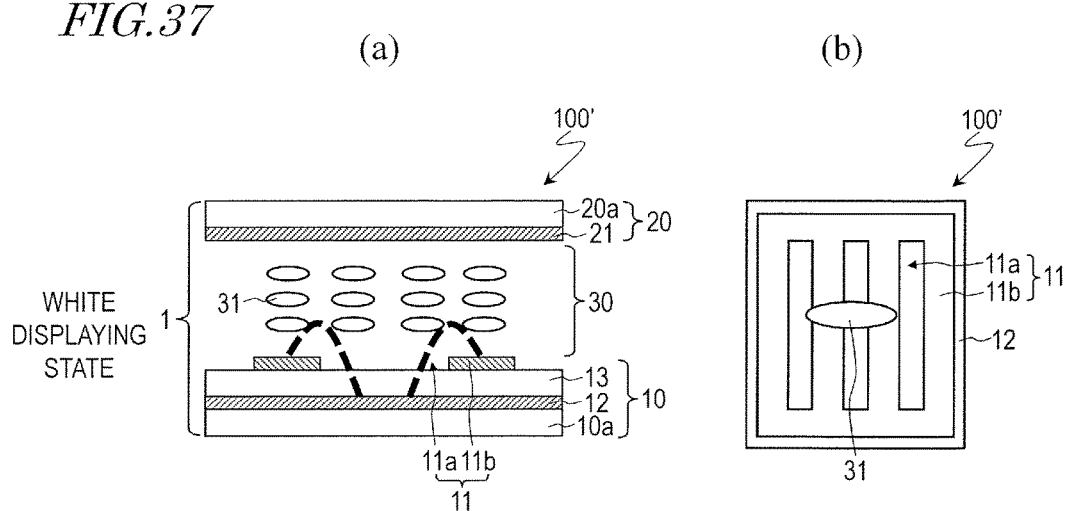
FIG. 37 (a) and (b) are a cross-sectional view and a plan view showing an alignment of liquid crystal molecules 31 in a white displaying state of the liquid crystal display device 100'.

FIGS. 37(a) and (b) show an alignment of liquid crystal molecules 31 in a white displaying state. In the white displaying state, a predetermined voltage is applied between the upper electrode 11 and the lower electrode 12, thereby generating a lateral field (fringing field) across the liquid crystal layer 30. FIG. 37(a) schematically shows the electric lines of force in this state with broken lines.

In this white displaying state, as shown in FIGS. 37(a) and (b), the liquid crystal molecules 31 in the liquid crystal layer 30 are aligned substantially parallel to the substrate plane (i.e., substantially vertically to the layer normal direction of the liquid crystal layer 30). More specifically, the liquid crystal molecules 31 are aligned so as to be substantially orthogonal to the direction D that the slits 11a in the upper electrode 11 extend. In other words, the liquid crystal molecules 31 are aligned so as to constitute angle of about 45° with the respective transmission axes 15a and 25a of the first polarizing plate 15 and the second polarizing plate 25.

Figure 38:
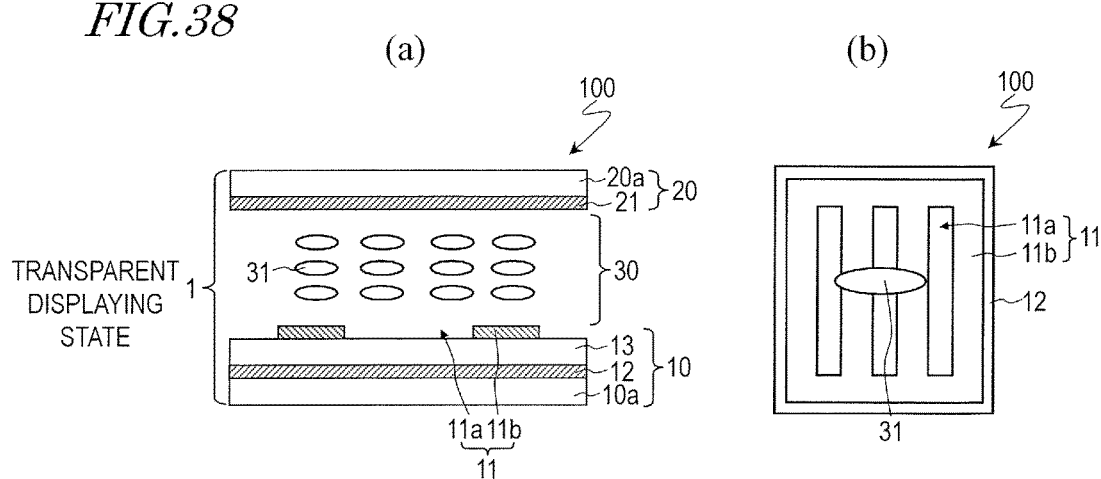
FIG. 38 (a) and (b) are a cross-sectional view and a plan view showing an alignment of liquid crystal molecules 31 in a transparent displaying state of the liquid crystal display device 100'.

FIGS. 38(a) and (b) show an alignment of liquid crystal molecules 31 in the transparent displaying state. In the transparent displaying state, no voltage is applied to the liquid crystal layer 30 (e.g., a potential of 0 V is given to all of the upper electrode 11, the lower electrode 12, and the counter electrode 21), so that neither a vertical field no a lateral field is generated across the liquid crystal layer 30.

In this transparent displaying state, the liquid crystal molecules 31 in the liquid crystal layer 30 take a homogeneous alignment, as shown in FIGS. 38(a) and (b). In other words, the liquid crystal molecules 31 are aligned substantially in parallel to the substrate plane (i.e., substantially vertically to the layer normal direction of the liquid crystal layer 30). More specifically, the liquid crystal molecules 31 are aligned so as to be substantially orthogonal to the direction D that the slits 11a in the upper electrode 11 extend. In other words, the liquid crystal molecules 31 are aligned so as to constitute an angle of about 45° with the respective transmission axes 15a and 25a of the first polarizing plate 15 and the second polarizing plate 25. The light transmittance of each pixel of the liquid crystal display device 100' is the highest in this transparent displaying state (i.e., higher than those in the black displaying state and the white displaying state).

In the liquid crystal display device 100', too, the voltage to be applied across the liquid crystal layer 30 in the second vertical scanning period is varied depending on whether it is case (A) (when the first vertical scanning period and the second vertical scanning period are to display the same gray scale level and the pixel is to perform white displaying in the second vertical scanning period), or case (B) (when the vertical scanning period and the second vertical scanning period are to display different gray scale levels and the pixel is to perform white displaying in the second vertical scanning period), whereby stability of alignment and response characteristics can be reconciled.

Although FIG. 1, FIG. 20, FIG. 27, and FIG. 34 illustrate constructions in which an edgelight-type backlight is disposed as the illumination element 2 on the rear face side of the liquid crystal display panel 1 so as to overlap the liquid crystal display panel 1, the illumination element 2 is not to be limited to this example.

Figure 39:
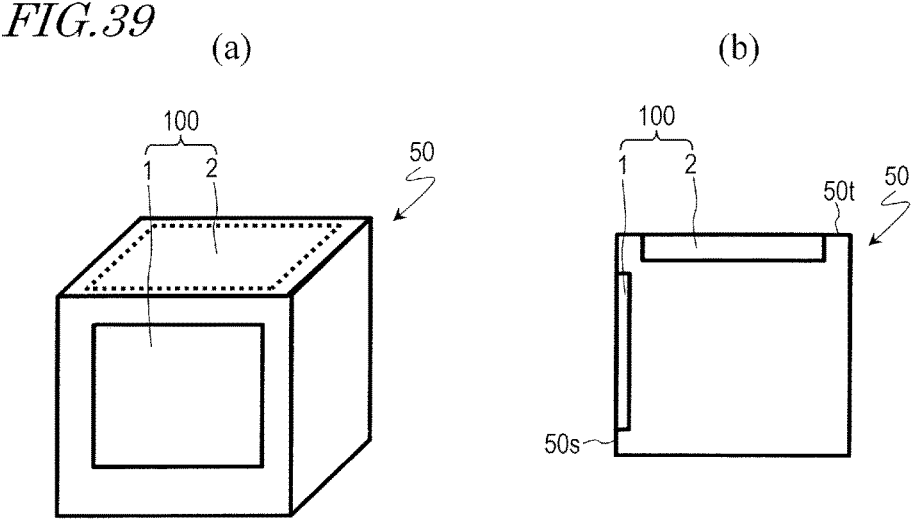
FIG. 39 (a) and (b) are a perspective view and a cross-sectional view schematically showing another construction for the liquid crystal display device 100.

For example, a construction shown in FIG. 39 may be adopted. In the construction shown in FIG. 39, the liquid crystal display panel 1 and the illumination element 2 of the liquid crystal display device 100 (or the liquid crystal display device 200, 300 or 100') are attached on a transparent case 50 of a box shape. The case 50 having the liquid crystal display panel 1 and the illumination element 2 attached thereto is used as a showcase, for example.

The liquid crystal display panel 1 is attached to a side face 50s, among a plurality of side faces of the case 50. The illumination element 2 is attached to an upper face 50t of the case 50. In a manner described above, the illumination element 2 is capable of switchably irradiating the liquid crystal display panel 1 with a plurality of color rays including red light, green light, and blue light. From the standpoint of enhancing the efficiency of light utilization (i.e., allowing as much light from the illumination element 2 to enter the liquid crystal display panel 1 as possible), it is preferable that the inner surface of the case 50 has a light diffusing property.

Although the above description illustrates the case where multicolor displaying is performed by the field sequential method, a liquid crystal display device according to an embodiment of the present invention may not necessarily perform multicolor displaying by the field sequential method. It may be a liquid crystal display device of a type whose liquid crystal display panel includes color filters.

INDUSTRIAL APPLICABILITY

According to an embodiment of the present invention, there is provided a liquid crystal display device which excels in both stability of alignment and response characteristics and is suitably used as a see-through display. A liquid crystal display device (see-through display) according to an embodiment of the present invention is used as a display device for an information display system or digital signage, for example.

REFERENCE SIGNS LIST 1 liquid crystal display panel
2 illumination element
2a light source unit
2b light guide plate
10 first substrate (rear substrate)
10a transparent substrate
11 first electrode (upper electrode)
11a slit
11b branch portion
12 second electrode (lower electrode)
12a slit
12b branch portion
13 insulating layer
14 first horizontal alignment film
15 first polarizing plate
15a transmission axis of first polarizing plate
16A first TFT
16B second TFT
17 gate bus line
18 source bus line
20 second substrate (front substrate)
20a transparent substrate
21 third electrode (counter electrode)
24 second horizontal alignment film
25 second polarizing plate
25a transmission axis of second polarizing plate
30 liquid crystal layer
31 liquid crystal molecules
50 case
100, 200, 300, 100' liquid crystal display device

The invention claimed is:

1. A liquid crystal display device comprising a liquid crystal display panel and having a pixel, the liquid crystal display panel including a first substrate and a second substrate opposed to each other and a liquid crystal layer interposed between the first substrate and the second substrate, wherein, the first substrate includes an upper electrode provided for the pixel, and a lower electrode disposed under the upper electrode via an insulating layer, the lower electrode generating a lateral field across the liquid crystal layer with the upper electrode;

the second substrate includes a counter electrode opposed to the upper electrode and the lower electrode, the counter electrode generating a vertical field across the liquid crystal layer with the upper electrode and the lower electrode;

the pixel is capable of switchably presenting a black displaying state of performing black displaying with a vertical field generated across the liquid crystal layer, a white displaying state of performing white displaying with a lateral field generated across the liquid crystal layer, or a transparent displaying state in which a rear face side of the liquid crystal display panel is visible in a see-through manner with no voltage being applied to the liquid crystal layer;

the upper electrode includes a plurality of branch portions extending along a predetermined direction, and at least one slit interposed between two mutually adjacent branch portions among the plurality of branch portions;

each of the plurality of branch portions has a width L which is equal to or greater than a width S of each of the at least one slit;

one vertical scanning period includes at least one write period in which a displaying voltage is written to the pixel;

a vertical scanning period is designated a first vertical scanning period, and a vertical scanning period that immediately follows the first vertical scanning period is designated a second vertical scanning period, and (A) when the first vertical scanning period and the second vertical scanning period are to display a same gray scale level and the pixel is to perform white displaying in the second vertical scanning period, the second vertical scanning period includes a write period in which a first potential difference V1 which is 60% or less of a potential difference V0 between the lower electrode and the counter electrode in the black displaying state is to be given to the upper electrode and the lower electrode, (B) when the first vertical scanning period and the second vertical scanning period are to display different gray scale levels and the pixel is to perform white displaying in the second vertical scanning period, the second vertical scanning period includes a write period in which a second potential difference V2 being greater than the first potential difference V1 is to be given to the upper electrode and the lower electrode;

in a write period in which the first potential difference V1 is to be given to the upper electrode and the lower electrode, substantially a same potential as that of the counter electrode is given to the upper electrode, and a different potential from that of the counter electrode is given to the lower electrode; and in a write period in which the second potential difference V2 is to be given to the upper electrode and the lower electrode, substantially a same potential as that of the counter electrode is given to the lower electrode, and a different potential from that of the counter electrode is given to the upper electrode.

2. The liquid crystal display device of claim 1, wherein, one vertical scanning period includes two said write periods; and in case (B), in each of a first-occurring write period and a second-occurring write period in the second vertical scanning period, the second potential difference V2 is given to the upper electrode and the lower electrode.

3. The liquid crystal display device of claim 1, wherein, one vertical scanning period includes two said write periods; and in case (A), in each of a first-occurring write period and a second-occurring write period in the second vertical scanning period, the first potential difference V1 is given to the upper electrode and the lower electrode.

4. The liquid crystal display device of claim 1, wherein, one vertical scanning period includes two said write periods; and in case (A), the second potential difference V2 is given to the upper electrode and the lower electrode in a first-occurring write period in the second vertical scanning period, and the first potential difference V1 is given to the upper electrode and the lower electrode in a second-occurring write period in the second vertical scanning period.

5. The liquid crystal display device of claim 1, wherein the second potential difference V2 is 80% or more of the potential difference V0 in the black displaying state.

6. The liquid crystal display device of claim 1, wherein the second potential difference V2 is substantially equal to the potential difference V0 in the black displaying state.

7. The liquid crystal display device of claim 1, wherein the first potential difference V1 is 54% or less of the potential difference V0 in the black displaying state.

8. The liquid crystal display device of claim 1, wherein the first potential difference V1 is 47% or less of the potential difference V0 in the black displaying state.

9. The liquid crystal display device of claim 1, wherein the first potential difference V1 is 30% or more of the potential difference V0 in the black displaying state.

10. The liquid crystal display device of claim 1, wherein, in the transparent displaying state; liquid crystal molecules in the liquid crystal layer take a twist alignment.

11. The liquid crystal display device of claim 10, wherein, in the white displaying state and in the transparent displaying state, liquid crystal molecules near a center of the liquid crystal layer along a thickness direction are aligned so as to be substantially orthogonal to the predetermined direction.

12. The liquid crystal display device of claim 1, wherein the liquid crystal layer comprises liquid crystal molecules having positive dielectric anisotropy.

13. The liquid crystal display device of claim 1, further comprising an illumination element capable of switchably irradiating the liquid crystal display panel with a plurality of color rays including red light; green light, and blue light, the liquid crystal display device performing multicolor displaying by a field sequential method.

14. The liquid crystal display device of claim 1, wherein the liquid crystal display panel includes no color filters.

15. A liquid crystal display device comprising a liquid crystal display panel and having a pixel, the liquid crystal display panel including a first substrate and a second substrate opposed to each other and a liquid crystal layer interposed between the first substrate and the second substrate, wherein, the first substrate includes an upper electrode provided for the pixel, and a lower electrode disposed under the upper electrode via an insulating layer, the lower electrode generating a lateral field across the liquid crystal layer with the upper electrode;

the second substrate includes a counter electrode opposed to the upper electrode and the lower electrode, the counter electrode generating a vertical field across the liquid crystal layer with the upper electrode and the lower electrode;

the pixel is capable of switchably presenting a black displaying state of performing black displaying with a vertical field generated across the liquid crystal layer, a white displaying state of performing white displaying with a lateral field generated across the liquid crystal layer, or a transparent displaying state in which a rear face side of the liquid crystal display panel is visible in a see-through manner with no voltage being applied to the liquid crystal layer;

the upper electrode includes a plurality of branch portions extending along a predetermined direction, and at least one slit interposed between two mutually adjacent branch portions among the plurality of branch portions;

each of the plurality of branch portions has a width L which is smaller than a width S of each of the at least one slit;

one vertical scanning period includes at least one write period in which a displaying voltage is written to the pixel;

a vertical scanning period is designated a first vertical scanning period, and a vertical scanning period that immediately follows the first vertical scanning period is designated a second vertical scanning period, and (A) when the first vertical scanning period and the second vertical scanning period are to display a same gray scale level and the pixel is to perform white displaying in the second vertical scanning period, the second vertical scanning period includes a write period in which a first potential difference V1 which is 60% or less of a potential difference V0 between the lower electrode and the counter electrode in the black displaying state is to be given to the upper electrode and the lower electrode, (B) when the first vertical scanning period and the second vertical scanning period are to display different gray scale levels and the pixel is to perform white displaying in the second vertical scanning period, the second vertical scanning period includes a write period in which a second potential difference V2 being greater than the first potential difference V1 is to be given to the upper electrode and the lower electrode;

in a write period in which the first potential difference V1 is to be given to the upper electrode and the lower electrode, substantially a same potential as that of the counter electrode is given to the lower electrode, and a different potential from that of the counter electrode is given to the upper electrode; and in a write period in which the second potential difference V2 is to be given to the upper electrode and the lower electrode, substantially a same potential as that of the counter electrode is given to the lower electrode, and a different potential from that of the counter electrode is given to the upper electrode.

16. The liquid crystal display device of claim 15, wherein, one vertical scanning period includes two said write periods; and in case (B), in each of a first-occurring write period and a second-occurring write period in the second vertical scanning period, the second potential difference V2 is given to the upper electrode and the lower electrode.

17. The liquid crystal display device of claim 15, wherein, one vertical scanning period includes two said write periods; and
in case (A), in each of a first-occurring write period and a second-occurring write period in the second vertical scanning period, the first potential difference V1 is given to the upper electrode and the lower electrode.

18. The liquid crystal display device of claim 15, wherein, one vertical scanning period includes two said write periods; and
in case (A), the second potential difference V2 is given to the upper electrode and the lower electrode in a first-occurring write period in the second vertical scanning period, and the first potential difference V1 is given to the upper electrode and the lower electrode in a second-occurring write period in the second vertical scanning period.

* * * * *